United States Patent
Park et al.

(10) Patent No.: US 10,007,148 B2
(45) Date of Patent: Jun. 26, 2018

(54) LIQUID CRYSTAL COMPOSITION AND LIQUID CRYSTAL DISPLAY COMPRISING THE SAME

(71) Applicant: Samsung Display Co., Ltd., Yongin, Gyeonggi-Do (KR)

(72) Inventors: Joon-Hyung Park, Seoul (KR); Kyung Seon Tak, Hwaseong-si (KR); Kang Seob Jeong, Seongnam-si (KR); Min-Hee Kim, Ansan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 14/480,805

(22) Filed: Sep. 9, 2014

(65) Prior Publication Data

US 2015/0267116 A1    Sep. 24, 2015

(30) Foreign Application Priority Data

Mar. 18, 2014 (KR) .................. 10-2014-0031847

(51) Int. Cl.
| | | |
|---|---|---|
| *G02F 1/1333* | (2006.01) | |
| *G02F 1/1337* | (2006.01) | |
| *C09K 19/12* | (2006.01) | |
| *C09K 19/06* | (2006.01) | |
| *C09K 19/32* | (2006.01) | |
| *C09K 19/54* | (2006.01) | |
| *C09K 19/30* | (2006.01) | |
| *C09K 19/04* | (2006.01) | |
| *G02F 1/1343* | (2006.01) | |

(52) U.S. Cl.
CPC .......... *G02F 1/1337* (2013.01); *C09K 19/062* (2013.01); *C09K 19/12* (2013.01); *C09K 19/32* (2013.01); *C09K 19/54* (2013.01); *C09K 2019/0448* (2013.01); *C09K 2019/122* (2013.01); *C09K 2019/3004* (2013.01); *G02F 2001/134318* (2013.01)

(58) Field of Classification Search
CPC .................. G02F 1/1333; G02F 1/1337; G02F 2001/134318; C09K 19/12; C09K 19/062; C09K 19/32; C09K 19/54; C09K 2019/3004; C09K 2019/0448; C09K 2019/122
USPC .............. 252/299.01, 299.6, 299.63, 299.66; 349/182; 428/1.1
See application file for complete search history.

(56) References Cited

U.S. PATENT DOCUMENTS

| | | |
|---|---|---|
| 7,731,865 B2 | 6/2010 | Bernatz et al. |
| 7,767,109 B2 | 8/2010 | Pai et al. |
| 8,092,871 B2 | 1/2012 | Usui et al. |
| 8,114,310 B2 | 2/2012 | Bernatz et al. |
| 8,968,597 B2* | 3/2015 | Furusato ............... C09K 19/56 252/299.6 |
| 2008/0304002 A1 | 12/2008 | Huh et al. |
| 2013/0077038 A1 | 3/2013 | Rho et al. |
| 2013/0208222 A1 | 8/2013 | Song et al. |
| 2014/0028959 A1 | 1/2014 | Seong et al. |
| 2014/0061534 A1* | 3/2014 | Goebel ............. C09K 19/3003 252/299.61 |
| 2014/0204329 A1 | 7/2014 | Bae et al. |

FOREIGN PATENT DOCUMENTS

| | | |
|---|---|---|
| CN | 103969863 A | 8/2014 |
| JP | 2010-138336 A | 6/2010 |
| JP | 4947339 B2 | 3/2012 |
| KR | 1020140014990 A | 2/2014 |

* cited by examiner

*Primary Examiner* — Geraldina Visconti

(74) *Attorney, Agent, or Firm* — Cantor Colburn LLP

(57) ABSTRACT

A liquid crystal composition includes a first compound expressed by following Chemical Formula 1 and about 0.001 wt % to about 0.05 wt % of a second compound expressed by following Chemical Formula 2, Chemical Formula 1

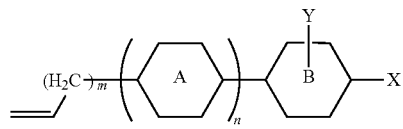

where A and B are a cyclo-hexyl group or a phenyl group, m is 0 to 4, n is 1 to 2, X is an alkyl group or an alkoxy group, and Y is one or two fluorine (F) or chlorine (Cl) atoms, and Chemical Formula 2

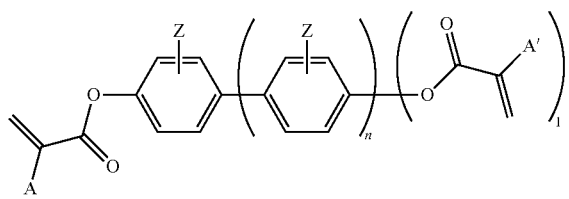

where n is 0 to 2, I is 0 to 1, Z is a halogen group, an alkyl group, or an alkoxy group, and A and A' are methyl groups that do not independently exist.

18 Claims, 10 Drawing Sheets

LIQUID CRYSTAL COMPOSITION AND LIQUID CRYSTAL DISPLAY COMPRISING THE SAME

This application claims priority to Korean Patent Application No. 10-2014-0031847 filed on Mar. 18, 2014, and all the benefits accruing therefrom under 35 U.S.C. the content of which in its entirety is herein incorporated by reference.

BACKGROUND (a) Field

The present invention relates to a liquid crystal composition and a liquid crystal display including the same. More particularly, the present invention relates to a liquid crystal composition including reactive mesogen ("RM") and a liquid crystal display using the same.

(b) Description of the Related Art

Liquid crystal displays are used for various appliances, measuring instruments, panels of vehicles, word processors, electronic notebooks, printers, computers, and televisions, including watches and electronic calculators. As for typical liquid crystal display types, for example, there are a Twisted Nematic ("TN") type, a Supertwisted Nematic ("STN") type, a Dynamic Optical Scattering ("DS") type, a Guest Host ("GH") type, an In-Plane Switching ("IPS") type, an Optical Compensation Birefringent ("OCB") type, an Electrically Controlled Birefringent ("ECB") type, a Vertical Alignment ("VA") type, a Color Super Homeotropic ("CSH") type, and a Ferroelectric Liquid Crystal ("FLC") type. As for typical driving types, multiplex driving is generally used in the static driving of the related art, so a simple matrix type and an active matrix ("AM") type driven by a Thin Film Transistor ("TFT") or a Thin Film Diode ("TFD") have been used in recent years.

The IPS type, ECB type, VA type, or CSH type of display devices are characterized by a liquid crystal material having negative dielectric anisotropy ($\Delta\in$), unlike the TN type of the STN type. In particular, the VA type liquid crystal displays by AM driving are used for display devices requiring a large viewing angle.

The liquid crystal material used for the VA type liquid crystal displays has low-voltage driving, rapid response, and a wide operation temperature range. That is, characteristics such as negative dielectric anisotropy having a large absolute value, low viscosity, and high nematic phase-isotropic liquid phase transition temperature (Tni) are present. Further, when setting $\Delta n \times d$, that is, the multiplication of refractive anisotropy ($\Delta n$) and a cell gap (d), the refractive anisotropy of the liquid crystal material is adjusted to fall within a predetermined range to fit to the cell gap. Further, while the cell gap of a display device is decreased to achieve rapid response, there is a limit in reducing the cell gap. It is therefore advantageous to use a liquid crystal composition having low viscosity in order to improve the response speed without changing the cell gap.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal composition having the advantage of including a predetermined amount of reactive mesogen with liquid crystal components and of having improved physical properties such as Voltage Holding Ratio ("VHR"), response speed, line residual image, and surface residual image. Liquid crystal displays including the liquid crystal composition are also provided.

In exemplary embodiments, a liquid crystal composition includes a first compound expressed by following Chemical Formula 1 and about 0.001 weight percent (wt %) to about 0.05 wt % of a second compound expressed by the following Chemical Formula 2, Chemical Formula 1

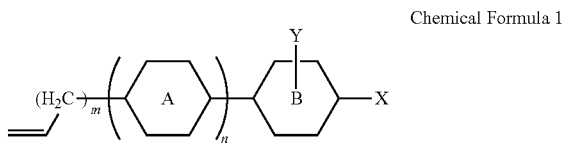

In which, A and B are a cyclo-hexyl group or a phenyl group, m is 0 to 4, n is 1 to 2, X is an alkyl group or an alkoxy group, and Y is one or two fluorine (F) or chlorine (Cl) atoms, and Chemical Formula 2

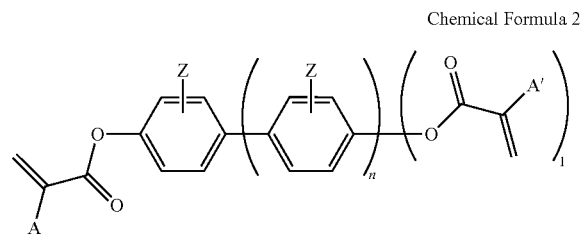

In which, n is 0 to 2, I is 0 to 1, Z is a halogen group, an alkyl group, or an alkoxy group, and A and A' are methyl groups.

The first compound is present in an amount of about 30 wt % to about 40 wt % and the second compound is present in an amount of about 0.02 wt % to about 0.03 wt % based on the total weight of the liquid crystal composition.

The first compound is a compound expressed by following Chemical Formula 3,

Chemical Formula 3

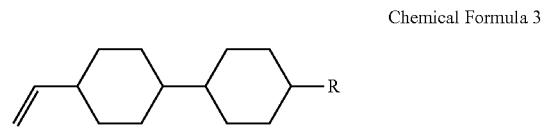

In which, R is an alkyl group or an alkoxy group.

The second compound is at least one compound expressed by following Chemical Formulae 4 to 6.

Chemical Formula 4

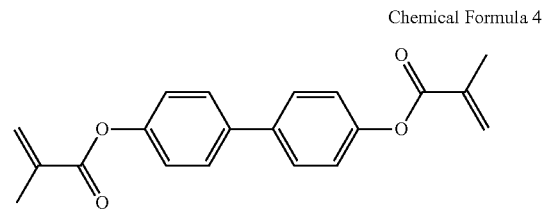

Chemical Formula 5

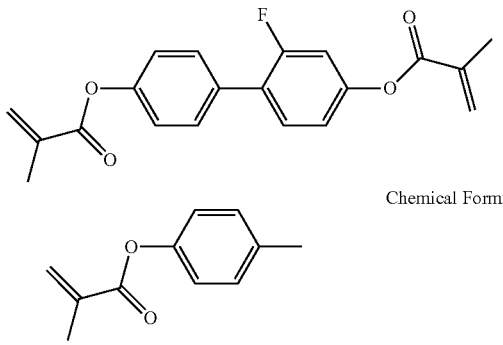

Chemical Formula 6

Chemical Formula 1

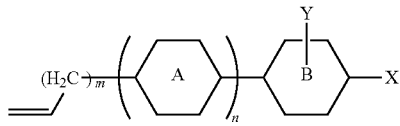

In which, A and B are a cyclo-hexyl group or a phenyl group, m is 0 to 4, n is 1 to 2, X is an alkyl group or an alkoxy group, and Y is one or two fluorine (F) or chlorine (Cl) atoms, and Chemical Formula 2

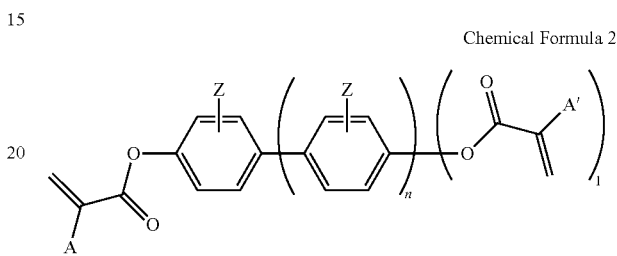

The liquid crystal composition further includes a third compound expressed by following Chemical Formula 7.

Chemical Formula 7

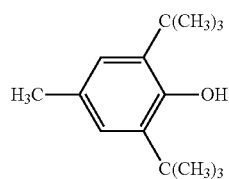

In which, n is 0 to 2, l is 0 to 1, Z is a halogen group, an alkyl group, or an alkoxy group, and A and A' are methyl groups.

The field generating electrode includes a pixel electrode on the first substrate and a common electrode on the second substrate, the pixel electrode includes first cutouts, the common electrode includes second cutouts, and the first cutouts are arranged alternately with the second cutouts.

The third compound is present in an amount of about 0.001 wt % to about 0.05 wt % based on the entire weight of the liquid crystal composition.

The liquid crystal molecules are vertically aligned when an electric field is not applied.

The first compound further includes at least one compound expressed by following Chemical Formula 8 and following Chemical Formula 9.

The field generating electrode includes a common electrode and a pixel electrode insulated from each other on the first substrate, and the liquid crystal display further includes a slit electrode defined by the cutouts of at least one of the common electrode and the pixel electrode.

Chemical Formula 8

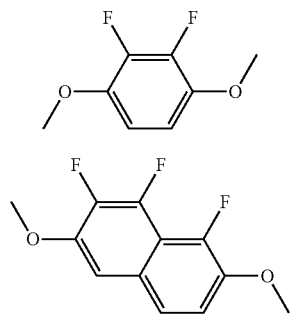

Chemical Formula 9

The liquid crystal molecules are horizontally aligned when an electric field is not applied.

As described above, in the liquid crystal composition and the liquid crystal display including the liquid crystal composition of the present invention, a predetermined amount of reactive mesogen is included with the liquid crystal component, so the physical properties such as a voltage holding ratio, response speed, line residual image, and surface residual image are excellent.

The first compound is present in an amount of about 30 wt % to about 40 wt % based on the total weight of the liquid crystal composition.

In other exemplary embodiments, a liquid crystal display includes: a first substrate; a second substrate facing the first substrate; a field generating electrode formed on at least one of the first substrate and the second substrate; and a liquid crystal layer including liquid crystal molecules between the first substrate and the second substrate, in which the liquid crystal molecules include a liquid crystal composition including a first compound expressed by following Chemical Formula 1, and about 0.001 wt % to about 0.05 wt % of a second compound expressed by following Chemical Formula 2,

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
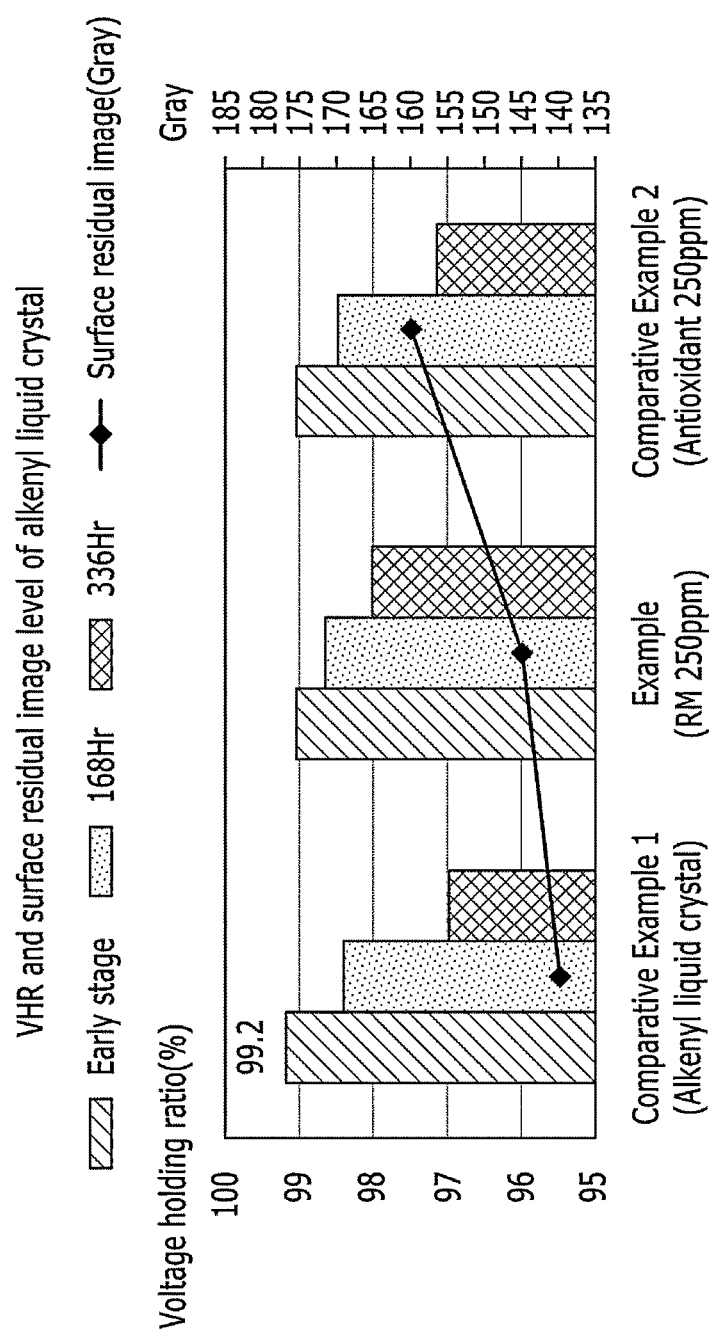
FIG. 1 is a graph illustrating the voltage holding ratio and the surface residual image level at various times for an exemplary embodiment of a liquid crystal composition.

The present invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, and the like, are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to increase the response speed of a liquid crystal display, the cell gap is reduced or the physical properties of the liquid crystals are improved, for example, as set forth in Equation 1. The physical properties of the liquid crystals may include, for example, rotational viscosity and an elastic coefficient.

$$T_{off}(\text{falling}) \propto \left(\frac{d}{\pi}\right)^2 \frac{Y1}{K_{eff}} \qquad \text{Equation 1}$$

Equation 1 illustrates the influence in the response speed in terms of falling time $T_{off}$ which is the time taken to change white into black. In Equation 1, d is the cell gap, $K_{eff}$ is the elastic coefficient, and Y1 is the rotational viscosity.

When the response speed is improved by reducing the cell gap, even if the retardation of the liquid crystal layer is compensated by high-refractive index liquid crystals, there are problems in quality and process such as a decrease of the yield and an increase of darkness of a stain produced due to foreign substances. Accordingly, for the physical properties of a liquid crystal, it is preferable to reduce the rotational viscosity and increase the elastic coefficient of the liquid crystals.

When the elastic coefficient is increased, the falling time is improved, but the voltage-transmittance curve of the liquid crystals shifts to the right, so side effects such as an increase in the threshold voltage $V_{th}$ and a decrease in the transmittance may occur. Accordingly, it is important to design a liquid crystal composition mixed with a high amount of a low-viscosity liquid component having a low molecular weight in order to improve the response speed by reducing the rotational viscosity.

In an exemplary embodiments, the design of a liquid crystal composition that can improve high a voltage holding ratio, a surface residual image, and a line residual image is described in detail by considering that the response speed can be improved by using a material having low rotational viscosity.

In an exemplary embodiment, a liquid crystal composition includes a first compound expressed by the following Chemical Formula 1 and a second compound expressed by the following Chemical Formula 2.

Chemical Formula 1

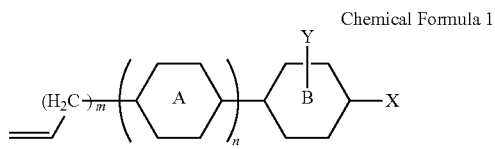

in which, A and B are a cyclo-hexyl group or a phenyl group, m is 0 to 4, n is 1 to 2, X is an alkyl group or an alkoxy group, and Y is replaced with one or two fluorine (F) or chlorine (Cl) atoms, and Chemical Formula 2

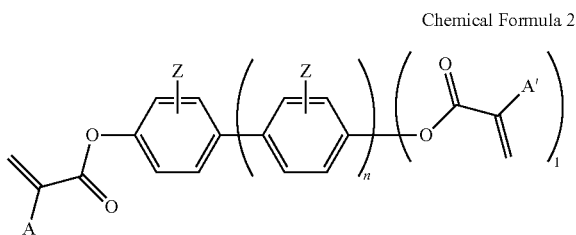

in which n is 0 to 2, I is 0 to 1, Z is a halogen group, an alkyl group, or an alkoxy group, and A and A' are methyl groups.

Since the first compound has the alkenyl group at the end, the higher the amount of the first compound in the liquid crystal composition, the more the viscosity of the liquid crystal composition is improved.

The second compound, a reactive mesogen ("RM") having high reactivity, is added to improve the physical properties of the liquid crystal composition. In contrast to conventional methods of using a reactive mesogen to produce an alignment layer, the liquid crystal composition described herein is produced by mixing the second compound with the first compound, so the reliability of the liquid crystal can be improved. The liquid crystal composition including the first compound alone, may have problems such as a decrease of the voltage holding ratio (VHR), a line residual image, or a surface residual image. However, in exemplary embodiments, by adding the second compound to the first compound, the voltage holding ratio, line residual image, and surface residual image can be improved.

The first compound may be the compound expressed by the following Chemical Formula 3, Chemical Formula 3

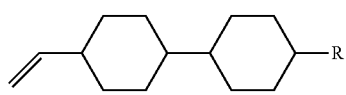

where R is an alkyl group or an alkoxy group.

The second compound may be a compound expressed by at least one of the following Chemical Formulae 4 to 6.

Chemical Formula 4

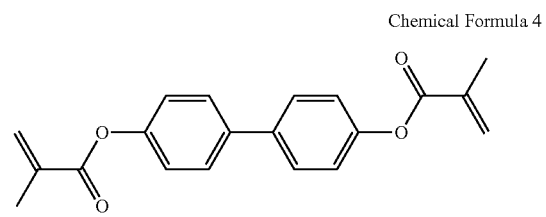

Chemical Formula 5

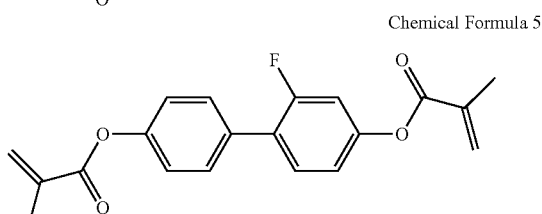

Chemical Formula 6

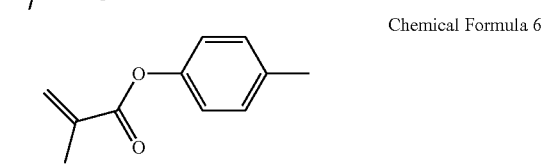

In exemplary embodiments, the liquid crystal composition may include the first compound in an amount of about 30 wt % to about 40 wt % and the second compound in an amount of about 0.001 wt % to about 0.05 wt % to the total weight of the liquid crystal composition, and specifically, includes the second compound in an amount of about 0.02 wt % to about 0.03 wt %.

A small amount of reactive mesogen is used in the liquid crystal composition, since the reactive mesogen may influence the alignment layer by acting as an alignment polymer, when the content increases over a predetermined level.

In exemplary embodiments, the liquid crystal composition may further include a third compound expressed by the following Chemical Formula 7.

Chemical Formula 7

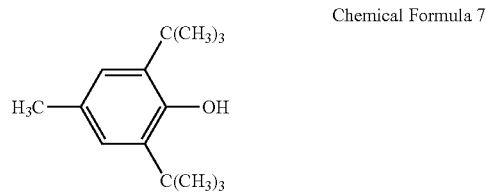 [SMILES: Cc1cc(C(C)(C)C)c(O)c(C(C)(C)C)c1]

The third compound functions as an antioxidant for the first compound. The third compound is present in an amount of about 0.001 wt % to about 0.05 wt % based on the total weight of the liquid crystal composition.

When the amount of the third compound is greater than about 0.05 wt %, the voltage holding ratio may be reduced, the liquid crystal display may be vulnerable to a residual image, and the phase stability of the liquid crystal molecules may decrease.

In general, a material having low rotational viscosity such as the first compound may produce a polar byproduct due to an oxidation side reaction. As a result, the voltage holding ratio may be reduced and a line residual image and a surface residual image may be generated.

Accordingly, the second compound having high reactivity reacts before oxidation of the first compound and polymerization of some of the second compounds proceeds or is completed, and thus it is possible to prevent the first compound from changing into a polar byproduct due to the side reaction of oxidation.

Further, the third compound also prevents the oxidation of the first compound. As a result, the third compound in cooperation with the second compound, can prevent reduction of the voltage holding ratio and can improve a line residual image and a surface residual image.

In exemplary embodiments, the liquid crystal composition may include a first compound including at least one compound selected from the compound expressed by Chemical Formula 1, the compound expressed by the following Chemical Formula 8 and the compound expressed by following Chemical Formula 9.

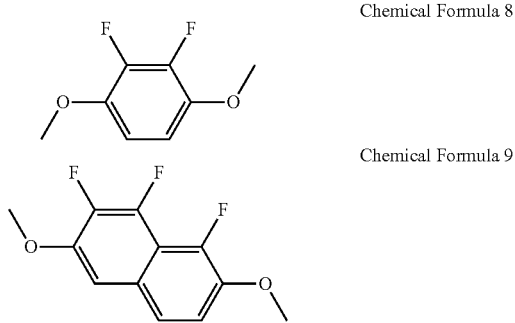

Chemical Formula 8

Chemical Formula 9

Hereinafter, the voltage holding ratio and the surface residual image level characteristics of an exemplary embodiment of a liquid crystal composition will be compared with a comparative example, with reference to FIG. 1.

FIG. 1 is a graph illustrating the results the voltage holding ratio and a surface residual image at various time points for a liquid crystal composition including a mixture of a first compound and a second compound (Example; RM).

As a comparative examples, the voltage holding ratio and the surface residual image level were determined for liquid crystal composition without reactive mesogen or an antioxidant (Comparative Example 1; "alkenyl liquid crystal") and a liquid crystal composition added with only an antioxidant (Comparative Example 2; "Antioxidant") were measured. In FIG. 1, the left vertical axis is the voltage holding ratio in percent (%) and the right vertical axis is the gray where a residual image disappears.

As illustrated in FIG. 1, when compared with the comparative examples, the Example liquid crystal composition a demonstrate a surface residual image level similar to the comparative liquid composition without an additional reactive mesogen compound. The data also shows that over time, the voltage holding ratio decreased less than either of the comparative examples.

Figure 2:
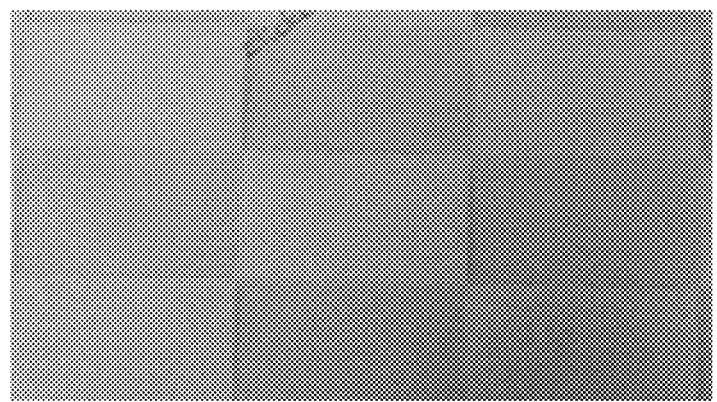
FIG. 2 shows the results of measuring a line residual image level of an exemplary embodiment of the liquid crystal composition.

Further, the line residual image level characteristic of the Example liquid crystal composition was also measured and is illustrated in FIG. 2.

FIG. 2 shows the result of measuring a line residual image with the lapse of time for the liquid crystal composition including a mixture of a first compound and a second compound.

As the result of observing whether a line residual image appears in the Example liquid crystal composition, it was found that at a high temperature of 60 degree Celsius (° C.), line residual images are generated after 500 hours. It was also found that the line residual image revelation time was improved in comparison to line residual images generated after 24 hours in liquid crystals without another additional (e.g. reactive mesogen) compound.

Next, an exemplary embodiment of a liquid crystal display will be described with reference to FIG. 3.

Figure 3:
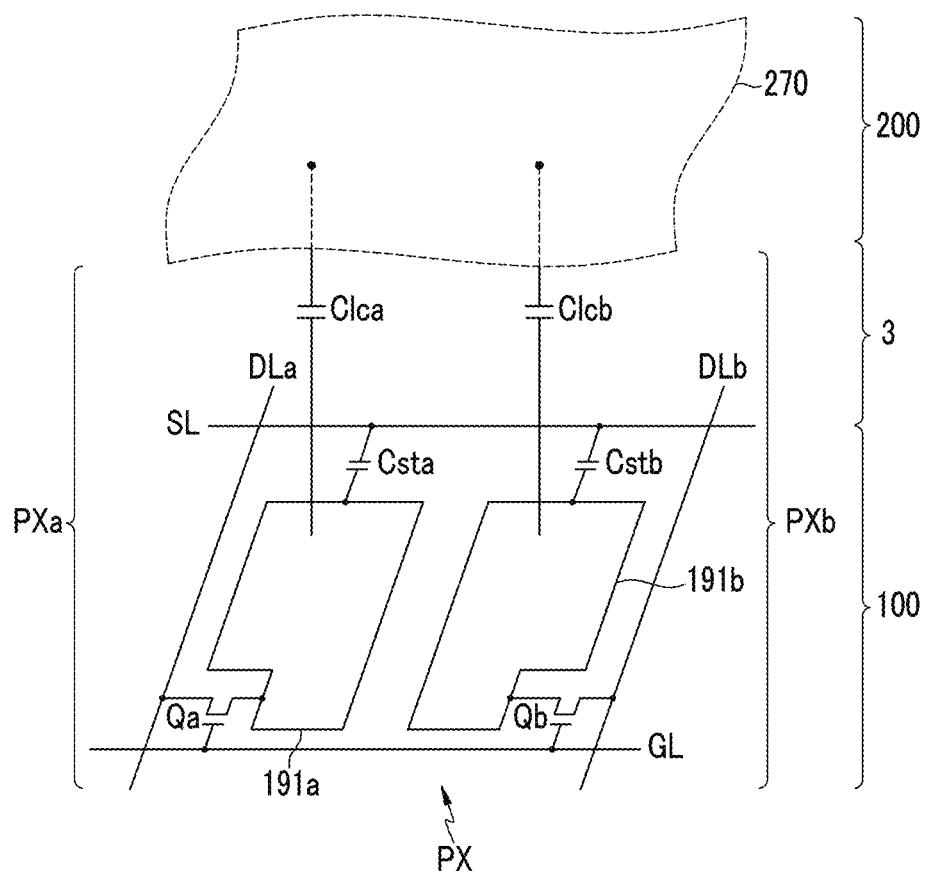
FIG. 3 is a circuit diagram of a pixel of an exemplary liquid crystal display.

FIG. 3 is a circuit diagram of a pixel of the exemplary embodiment of the liquid crystal display.

Referring to FIG. 3, a liquid crystal display includes a thin film transistor array panel 100 and a common electrode panel 200, which face each other, and a liquid crystal layer 3 between the panels.

The liquid crystal display includes signal lines including a plurality of gate lines GL, a plurality of pairs of data lines DLa and DLb, and a plurality of storage electrode lines SL, and a plurality of pixels PX connected with the signal lines.

The pixels PX each include a pair of subpixels PXa and PXb and the subpixels PXa and PXb include switching elements Qa and Qb, liquid crystal capacitors Clca and Clcb, and storage capacitors Csta and Cstb, respectively.

The switching elements Qa and Qb are three terminal elements such as thin film transistors on the lower panel 100, with the control terminals connected to the gate lines GL, the input terminals connected to the data lines DLa and DLb, and the output terminals connected to the liquid crystal capacitors Clca and Clcb and the storage capacitors Csta and Cstb.

The liquid crystal capacitors Clca and Clcb are formed to have subpixel electrodes 191a and 191b and a common electrode 270 as two terminals and the liquid crystal layer 3 between the terminals as a dielectric material.

The storage capacitors Csta and Cstb assist the liquid crystal capacitors Clca and Clcb, and are formed by overlapping storage electrode line SL and subpixel electrodes 191a and 191b with an insulator therebetween on the lower panel 100 and a predetermined voltage such as a common voltage ("Vcom") is applied to the storage electrode line SL.

The voltages accumulated in the liquid crystal capacitors Clca and Clcb are set to be a different. In an exemplary embodiment, for example, a data voltage applied to the liquid crystal capacitor Clca is set lower or higher than the data voltage applied to the adjacent liquid crystal capacitor Clcb. As the voltages of the liquid crystal capacitors Clca and Clcb are appropriately controlled, the image seen from the side can be made similar to the image seen from the front and the side visibility of the liquid crystal display is improved.

Next, the exemplary liquid crystal display will be described in more detail with reference to FIGS. 4 and 5.

Figure 4:
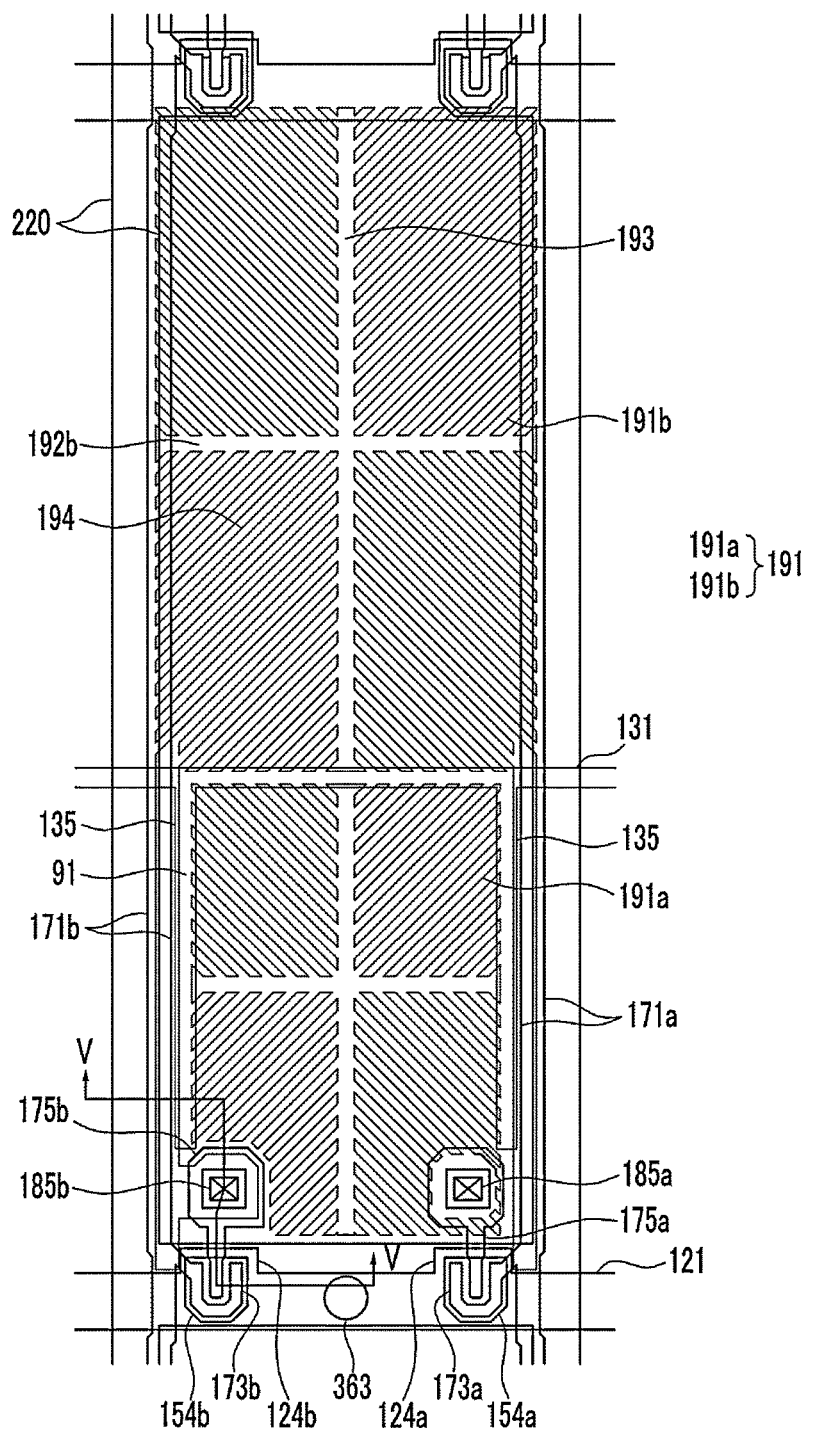
FIG. 4 is a plan view of an exemplary embodiment of the liquid crystal display.
Figure 5:
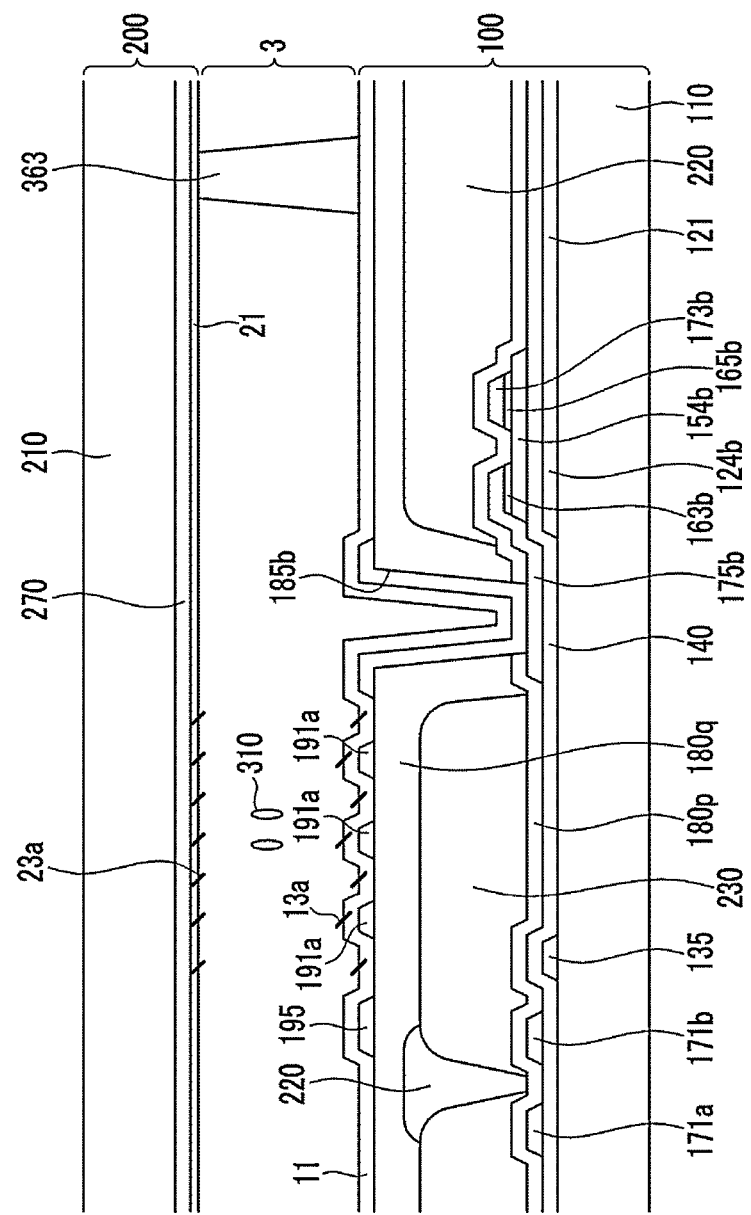
FIG. 5 is a cross-sectional view taken along line V-V of the exemplary liquid crystal display in FIG. 4.

FIG. 4 is a plan view of the exemplary liquid crystal display and FIG. 5 is a cross-sectional view taken along line V-V of FIG. 4.

Referring to FIGS. 4 and 5, the exemplary liquid crystal display includes a lower panel 100 and an upper panel 200, which face each other, and a liquid crystal layer 3 between the two panels 100 and 200.

First, the lower panel 100 is described.

A plurality of gate lines 121 and a plurality of storage electrode lines 131 and 135 are formed on an insulation substrate 110.

The gate lines 121 transmit gate signals and usually transversely extend. The gate lines 121 each include a plurality of first and second gate electrodes 124a and 124b protruding upward.

The storage electrode lines 131 and 135 include a stem substantially extending parallel to the gate line 121 and a plurality of storage electrodes 135 extending from the stem. However, the shape and arrangement of the storage electrode lines 131 and 135 may be changed in various ways.

The gate line 121 and the storage electrode line 131 and 135 may be made of at least one of the group of aluminum (Al) or aluminum-based metal such as an aluminum alloy, silver (Ag) and silver-based metal such as a silver alloy, and copper (Cu) or copper-based metal such as a copper alloy.

Although the gate line 121 and the gate electrodes 124a and 124b are formed in single layers in the present exemplary embodiment, they are not limited thereto, and may be formed as a dual layer or a triple layer.

When they have dual-layer structure, the gate line 121 and the gate electrodes 124a and 124b may be formed as a lower layer and an upper layer, in which the lower layer may be made of at least one selected from the group of molybdenum (Mo) and molybdenum-based metal such as a molybdenum alloy, chromium (Cr), a chromium alloy, titanium (Ti), a titanium alloy, tantalum (Ta), a tantalum alloy, manganese (Mg), and a manganese alloy. The upper layer may be made of at least one selected from the group of aluminum (Al) or aluminum-based metal such as an aluminum alloy, silver (Ag) and silver-based metal such as a silver alloy, and copper (Cu) or copper-based metal such as a copper alloy. When they are formed in triple-layer structures, they may be formed by combining layers with different physical properties.

A gate insulating layer 140 is formed on the gate line 121 and the storage electrode lines 131 and 135 and a plurality of semiconductors 154a and 154b made of amorphous or crystalline silicon is formed on the gate insulating layer 140.

A plurality of pairs of ohmic contacts 163b and 165b is formed on the semiconductors 154a and 154b, respectively, the ohmic contacts 163b and 165b may be made of n+ hydrogenated amorphous silicon doped with silicide or n-type impurities at high concentration.

A plurality of pairs of data lines 171a and 171b and a plurality of pairs of first and second drain electrodes 175a and 175b are formed on the ohmic contact 163b and 165b and gate insulating layer 140.

The data lines 171a and 171b transmit data signals and usually longitudinally extend across the gate line 121 and the stem of the storage electrode line. The data lines 171a and 171b include first and second source electrodes 173a and 173b extending toward the first and second gate electrodes 124a and 124b and bending in a U-shape and the first and second source electrodes 173a and 173b meet the first and second drain electrodes 175a and 175b around the first and second gate electrodes 124a and 124b.

The data lines 171a and 171b may be made of at least one selected from the group of aluminum (Al) or aluminum-based metal such as an aluminum alloy, silver (Ag) and silver-based metal such as a silver alloy, and copper (Cu) or copper-based metal such as a copper alloy. Although the data lines 171a and 171b are formed in single layers in the present exemplary embodiment, they are not limited thereto and may be formed in dual layers or triple layers.

The first and second drain electrodes 175a and 175b extend upward from ends covered by the first and second source electrodes 173a and 173b and the other ends may have large areas for connection with another layer.

The shape and arrangement of the data lines 171a and 171b, including the first and second drain electrodes 175a and 175b may be changed in various ways.

The first and second gate electrodes 124a and 124b, the first and second source electrodes 173a and 173b, and the first and second drain electrodes 175a and 175b make first and second thin film transistors Qa and Qb in cooperation with the first and second semiconductors 154a and 154b, and the channels of the first and second thin film transistors Qa and Qb are formed at the first and second semiconductors 154a and 154b between the first and second source electrodes 173a and 173b and the first and second drain electrodes 175a and 175b.

The ohmic contacts 163b and 165b are disposed only between the semiconductors 154a and 154b thereunder, the data lines 171a and 171b thereon, and the drain electrodes 175a and 175b and decrease contact resistance between them. The semiconductors 154a and 154b have the portions that are exposed without being covered by the data lines 171a and 171b and the drain electrodes 175a and 175b, between the source electrodes 173a and 173b and the drain electrodes 175a and 175b.

A lower passivation layer 180p made of silicon nitride or silicon oxide is formed on the data lines 171a and 171b, the drain electrodes 175a and 175b, and the exposed portions of the semiconductors 154a and 154b.

A color filter 230 is formed on the passivation layer 180p. The color filter 230 may include three color filters of red, green, and blue. A single layer or a double layer made of chromium and a chromium oxide or a light blocking member 220 made of an organic material is formed on the color filter 230. The light blocking member 220 may have openings arranged in a matrix.

An upper passivation layer 180q made of a transparent organic insulating material is formed on the color filter 230 and the light blocking member 220. The upper passivation layer 180q prevents the color filter 230 from being exposed and provides a planarized surface. A plurality of contact holes 185a and 185b exposing the first and second drain electrodes 175a and 175b is formed through the upper passivation layer 180q.

A plurality of pixel electrodes 191 is formed on the upper passivation layer 180q. The pixel electrodes 191 may be made of a transparent conductive material such as indium tin oxide ("ITO") or indium zinc oxide ("IZO"), or reflexible metal such as aluminum, silver, or chromium, or alloys thereof.

The pixel electrodes 191 each include first and second subpixel electrodes 191a and 191b separated from each other, the first and second subpixel electrodes 191a and 191b each have a cross stem portion composed of a transverse stem portion 192b and a longitudinal stem portion 193 crossing it, and have fine branches 194 extending at an angle from the transverse stem portion 192b and the longitudinal stem portion 193.

Then, the upper panel 200 is described.

The common electrode 270 is formed on the transparent insulation substrate 210, on the front of the upper panel 200.

A spacer 363 for keeping the gap between the upper panel 200 and the lower panel 100 is formed.

The inner sides of the lower panel 100 and the upper panel 200 are coated with alignment layers 11 and 21 and they may be vertical alignment layers. The alignment layers 11 and 21, liquid crystal alignment layers made of polyamic acid or polyimide, may contain at least one of materials that are generally used. The alignment layers 11 and 21 include alignment polymers 13a and 23a formed by radiating light to alignment assistants. The alignment polymer may be reactive mesogen.

The reactive mesogen included in the alignment layer is not the same reactive mesogen added to the exemplary liquid crystal composition described herein, but rather, is a reactive mesogen which is polymerized during the formation of an alignment layer.

A polarizer (not illustrated) may be disposed on the outer sides of the lower panel 100 and the upper panel 200.

The liquid crystal layer 3 is disposed between the lower panel 100 and the upper panel 200. The liquid crystal layer 3 includes a plurality of liquid crystal molecules 310.

The liquid crystal molecule 310 has negative dielectric anisotropy and the long axis is aligned substantially perpendicular to the surfaces of the panels 100 and 200 when there is no electric field.

In the present exemplary embodiment, the liquid crystal layer 3 includes the liquid crystal molecules 310 made of the exemplary liquid crystal composition described herein. In detail, in an exemplary embodiment, the liquid crystal layer 3 includes a first compound expressed by the following Chemical Formula 1 and a second compound expressed by the following Chemical Formula 2, Chemical Formula 1

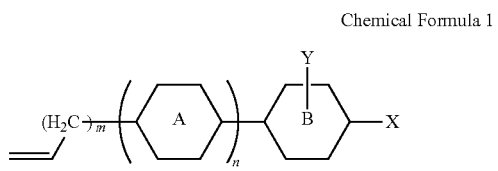

where A and B are a cyclo-hexyl group or a phenyl group, m is 0 to 4, n is 1 to 2, X is an alkyl group or an alkoxy group, and Y represents one or two fluorine (F) or chlorine (Cl) atoms, and Chemical Formula 2

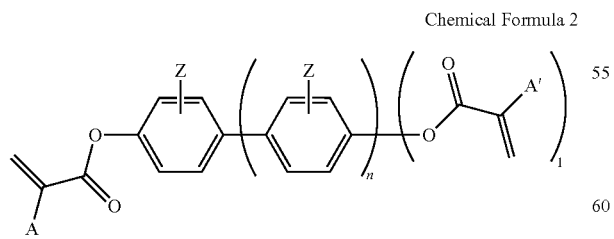

where n is 0 to 2, l is 0 to 1, Z is a halogen group, an alkyl group, or an alkoxy group, and A and A' are methyl groups.

The first compound may be the compound expressed by the following Chemical Formula 3, Chemical Formula 3

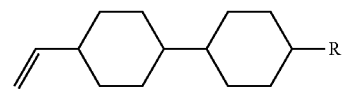

where R is an alkyl group or an alkoxy group.

The second compound may a compounds expressed by at least one of the following Chemical Formulae 4 to 6.

Chemical Formula 4

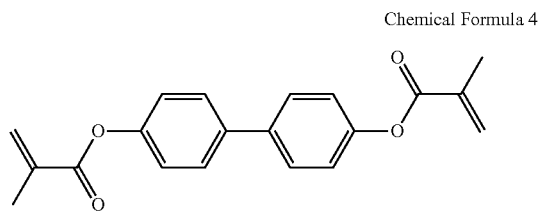

Chemical Formula 5

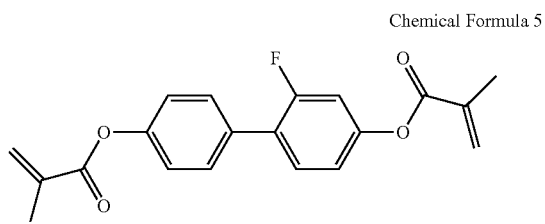

Chemical Formula 6

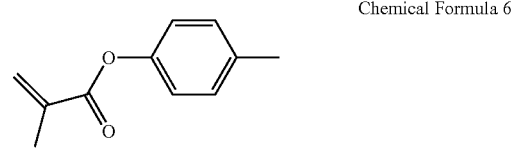

In an exemplary embodiment, the liquid crystal composition may include the first compound in an amount of about 30 wt % to about 40 wt % and the second compound in an amount of about 0.001 wt % to about 0.05 wt % based on the total weight of the liquid crystal composition.

In an exemplary embodiment, the liquid crystal composition may further include a third compound expressed by the following Chemical Formula 7.

Chemical Formula 7

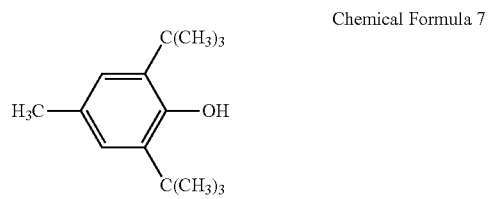 [SMILES: Cc1cc(C(C)(C)C)c(O)c(C(C)(C)C)c1]

The third compound may function as an antioxidant for the first compound, and the third compound may be present in an amount of about 0.001 wt % to about 0.05 wt % can be included.

In an exemplary embodiment, the liquid crystal composition may include at least one first compound expressed by Chemical Formula 1, the compound expressed by the following Chemical Formula 8 and the compound expressed by Chemical Formula 9.

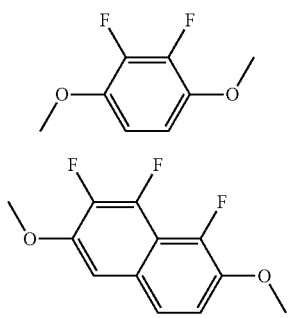

Chemical Formula 8

Chemical Formula 9

The description of the exemplary liquid crystal composition which was provided above can be applied to the liquid crystal composition in the liquid crystal layer 3 of the exemplary liquid crystal display.

When a voltage is applied to the pixel electrode 191 and the common electrode 270, the liquid crystal molecules 310 change the long axes to be perpendicular to an electric field generated between the pixel electrode 191 and the common electrode 270, in response to the electric field. The degree of polarization of the light traveling into the liquid crystal layer 3 depends on the degree of inclination of the liquid crystal 310. The change in polarization causes a change in transmittance by the polarizer, and accordingly, the liquid crystal display displays an image.

The inclination direction of the liquid crystal molecules 310 depends on the fine stem portion 194 of the pixel electrode 191 and the liquid crystal molecules 310 incline parallel to the longitudinal direction of the fine stem portion 194. Since one pixel electrode 191 includes four sub-regions having different longitudinal directions of the fine stem portions 194, the inclination direction of the liquid crystal molecules 310 is in four directions and as a result, four domains in which the alignment direction of the liquid crystal molecules 310 are different, are formed in the liquid crystal layer 3. It is possible to improve the viewing angle of the liquid crystal display by varying the inclination angle of the liquid crystal.

In the exemplary liquid crystal display, the alignment polymers 13a and 23a formed by polymerizing an alignment assistant, control the pre-tilt, that is, the initial alignment direction of the liquid crystal molecules 310, and the response speed can be considerably improved by designing a liquid crystal composition having low rotational viscosity.

Figure 6:
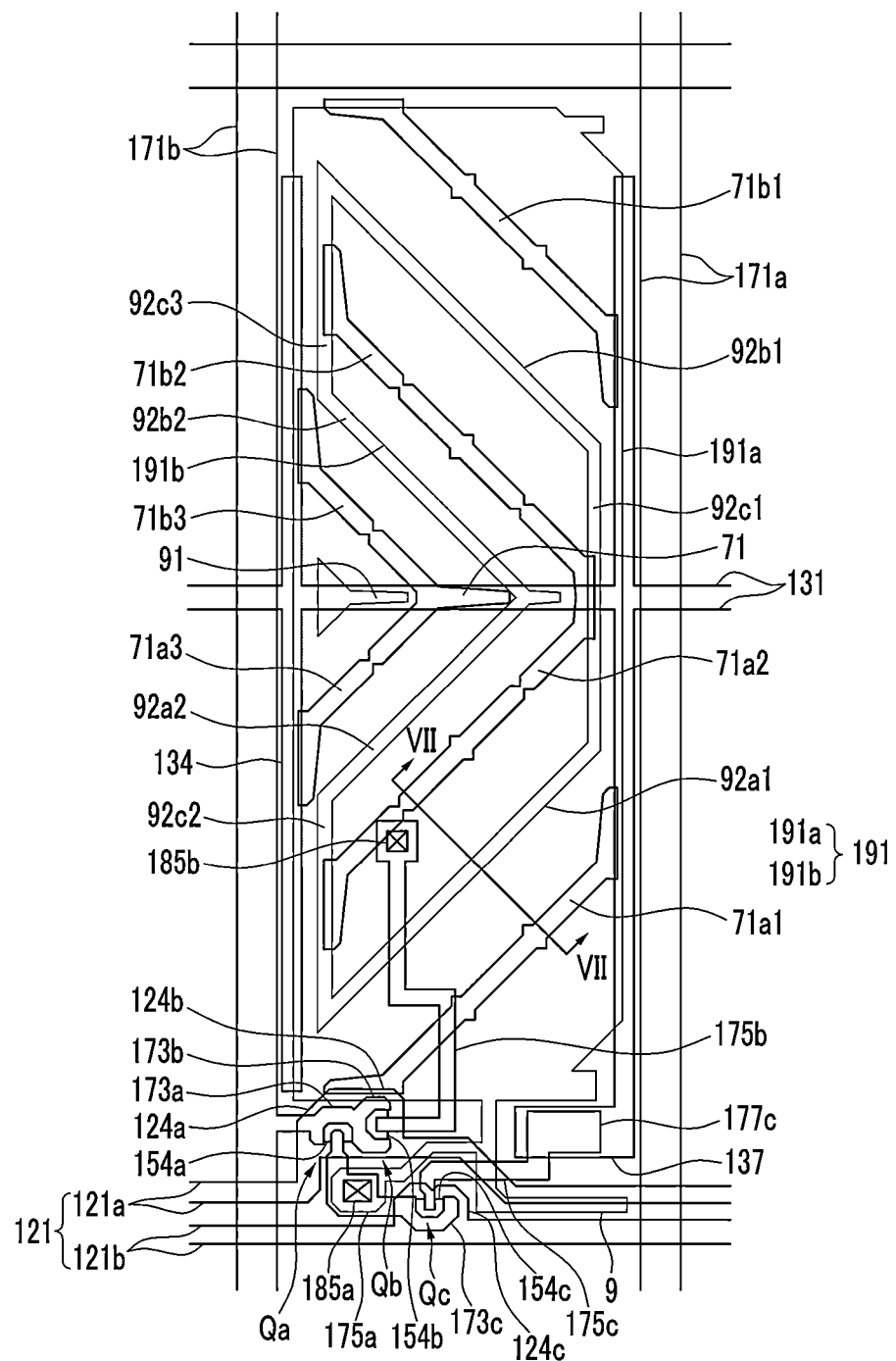
FIG. 6 is a plan view of another exemplary liquid crystal display.
Figure 7:
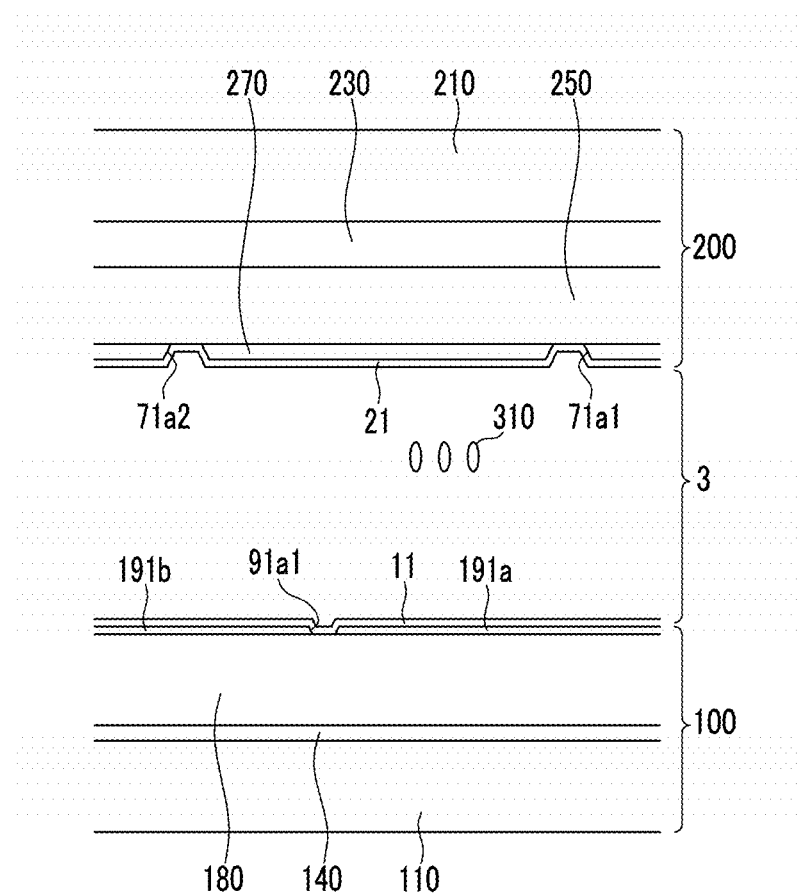
FIG. 7 is a cross-sectional view taken along line VII-VII of the exemplary liquid crystal display in FIG. 6.

FIG. 6 is a plan view of an exemplary embodiment of a liquid crystal display and FIG. 7 is a cross-sectional view taken along line VII-VII of FIG. 6.

First, the lower panel 100 is described.

A plurality of gate lines 121 including a first gate line 121a and a second gate line 121b and a plurality of storage electrode lines 131 are formed on an insulating substrate 110.

The first gate line 121a and the second gate line 121b usually extend transversely and transmit gate signals. The first gate line 121a includes a first gate electrode 124a and a second gate electrode 124b which protrude upward and the second gate line 121b includes a third gate electrode 124c. The first gate electrode 124a and the second gate electrode 124b make one protrusion by being connected with each other.

The storage electrode line 131 also generally extends transversely and transmits a predetermined voltage such as a common voltage Vcom. The storage electrode 131 includes a pair of longitudinal portions 134 extending substantially perpendicular to the gate line 121 and a capacitor electrode 137 protruding and expanding from the longitudinal portion 134.

A gate insulating layer 140 is formed on the gate line 121 and the storage electrode line 131 and a plurality of semiconductor stripes (not illustrated) that may be made of amorphous or crystalline silicon is formed on the gate insulating layer 140. The semiconductor stripes usually extend longitudinally and include first and second semiconductor 154a and 154b extending toward the first and second gate electrodes 124a and 124b and connected with each other and a third semiconductor 154c positioned at the third gate electrode 124c.

A plurality of ohmic contacts (not illustrated) is formed on the semiconductors 154a, 154b, and 154c. The ohmic contact may be made of a substance such as n+ hydrogenated amorphous silicon doped with silicide or n-type impurities at high concentration.

A data conductor including a plurality of data lines 171a and 171b, a plurality of first drain electrodes 175a, a plurality of second drain electrodes 175b, and a plurality of third drain electrodes 175c is formed on the ohmic contact.

The data lines 171a and 171b transmit data signals and usually longitudinally extend across the first gate line 121a and the second gate line 121b. The data lines 171a and 171b include a first source electrode 173a and a second source electrode 173b that may extend toward the first gate electrode 124a and the second gate electrode 124b and may be connected with each other. The first source electrode 173a and the second source electrode 173b meet the first drain electrode 175a and the second drain electrode 175b, respectively, around the first gate electrode 124a and the second gate electrode 124b.

The first drain electrode 175a, the second drain electrode 175b and the third drain electrode 175c have one bar-shaped end portion and the other end portion having a relatively large area. The bar-shaped end portions of the first drain electrode 175a and the second drain electrode 175b are partially surrounded by the first source electrode 173a and the second source electrode 173b. The wide end portion of the first drain electrode 175a makes a third source electrode 173c bending in a U-shape by extending again and the third source electrode 173c meets a third drain electrode 175c. The wide end portion 177c of the third drain electrode 175c makes a voltage reduction capacitor Cstd by overlapping the capacitor electrode 137 and the bar-shaped end portion is partially surrounded by the third source electrode 173c.

The first gate electrode 124a, the first source electrode 173a, and the first drain electrode 175a make a first thin film transistor Qa in cooperation with the first semiconductor 154a, the second gate electrode 124b, the second source electrode 173b, and the second drain electrode 175b make a second thin film transistor Qb in cooperation with the second semiconductor 154b, and the third gate electrode 124c, the third source electrode 173c, and the third drain electrode 175c make a third thin film transistor Qc in cooperation with the third semiconductor 154c.

The semiconductor stripe including the first semiconductor 154a, the second semiconductor 154b, and the third semiconductor 154c may have a surface shape substantially the same as those of the data lines 171a, 171b, the source electrodes 173a, 173b, 173c, and the drain electrodes 175a, 175b, and 175c, the ohmic contacts thereunder, except for the channel regions between the source electrodes 173a, 173b, and 173c and the drain electrodes 175a, 175b, and 175c.

The first semiconductor 154a has a portion exposed, not covered by the first source electrode 173a and the first drain electrode 175a, between the first source electrode 173a and the first drain electrode 175a, the second semiconductor 154b has a portion exposed, not covered by the second source electrode 173b and the second drain electrode 175b, between the second source electrode 173b and the second drain electrode 175b, and the third semiconductor 154c has a portion exposed, not covered by the third source electrode 173c and the third drain electrode 175c, between the third source electrode 173c and the third drain electrode 175c.

A passivation layer 180 that may be made of an inorganic insulator such as a silicon nitride or a silicon oxide is formed on the data lines 171a, 171b, the source electrodes 173a, 173b, 173c, the drain electrodes 175a, 175b, and 175c, and the exposed portions of the first, second and third semiconductors 154a, 154b, and 154c.

However, the passivation layer 180 may be made of an organic insulator and have a planarized surface. The passivation layer 180 may also have a dual-layer structure of a lower inorganic layer and an upper organic layer in order not to damage the exposed portions of the semiconductors 154a, 154b, and 154c with the excellent insulating characteristic of an organic layer kept.

A plurality of contact holes 185a and 185b exposing the first drain electrode 175a and the second drain electrode 175b is formed through, and defined in, the passivation layer 180.

A pixel electrode 191 including a first subpixel electrode 191a and a second subpixel electrode 191b and a shielding electrode 9 are formed on the passivation layer 180. The pixel electrode 191 may be made of a transparent conductive material such as ITO or IZO, or reflexible metal such as aluminum, silver, or chromium or alloys of them.

A transverse center cutout 91, a longitudinal center connecting cutout 92c1, lower orthogonal cutouts 92a1, and 92a2, lower connecting cutout 92c2, upper connecting cutouts 92b1, and 92b2, and upper connecting cutout 92c3, are formed in the pixel electrode 191 and the pixel electrode 191 is partitioned into a plurality of regions by the cutouts 91, 92c1, 92a1, 92a2, 92c2, 92b1, 92b2, and 92c3. The cutouts 91, 92a1, 92a2, 92c2, 92b1, 92b2, and 92c3 are substantially reversely symmetric to each other with respect to a virtual transverse center line dividing the pixel electrode 191 into two equal parts.

In detail, the pixel electrode 191 has connecting cutouts 92c1, 92c2, and 92c3 that connect upper and lower orthogonal cutouts 92a1, 92a2, 92b1, and 92b2 and orthogonal portions 92a1, 92a2, 92b1, and 92b2 which are positioned in the lower and upper half relative the transverse center line of the pixel electrode 191. The upper orthogonal cutouts 92a1, 92a2, and the lower orthogonal cutouts 92b1, and 92b2, extend at an angle substantially from the right side to the left side of the pixel electrode 191 and may extend perpendicular to each other at an angle of about 45 degrees with respect to the gate line 121.

The lower half part of the pixel electrode 191 is partitioned into two regions by the lower orthogonal cutouts 92a1 and 92a2 and the upper half part is also partitioned into two regions by the upper orthogonal cutouts 92b1 and 92b2. In detail, the lower orthogonal cutouts 92a1 and 92a2, the upper orthogonal cutouts 92b1 and 92b2, and the connecting cutouts 92c1, 92c2, and 92c3 can make a closed circuit, and the pixel electrode 191 can be separated into the first subpixel electrode 191a and the second subpixel electrode 191b by the lower orthogonal cutouts 92a1 and 92a2, the upper orthogonal cutouts 92b1 and 92b2, and the connecting cutouts 92c1, 92c2, and 92c3.

The number of the pixel electrode regions or the number of the cutouts may depend on design factors such as the size of the pixel electrode 191, the length ratio of the left side and the right side of the pixel electrode 191, and the type or the characteristics of the liquid crystal layer 3.

The first subpixel electrode 191a and the second subpixel electrode 191b are connected with the first drain electrode 175a and the second drain electrode 175b through the contact holes 185a and 185b, respectively, and receive a data voltage from the first drain electrode 175a and the second drain electrode 175b.

The first subpixel electrode 191a and the second subpixel electrode 191b receiving the data voltage generate an electric field together with the common electrode 270 of the upper panel 200, thereby determining the direction of the liquid crystal molecules 310 in the liquid crystal layer 3 between the two electrodes. The liquid crystal molecules in the liquid crystal layer which are aligned perpendicular to the surfaces of the two electrodes when there is no electric field lie horizontally with respect to the surfaces of the two electrodes and the luminance of the light passing through the liquid crystal layer depends on the lying degree of the liquid crystal molecules.

The first subpixel electrode 191a and the common electrode 270 constitute the first liquid crystal capacitor Clca together with the liquid crystal layer 3 therebetween, and the second subpixel electrode 191b and the common electrode 270 constitute the second liquid crystal capacitor Clcb together with the liquid crystal layer 3 therebetween, and thus the applied voltage is kept even after the first and second thin film transistors Qa and Qb are turned off.

The first subpixel electrode 191a and the second subpixel electrode 191b make a first storage capacitor Csta and a second storage capacitor Cstb by overlapping the storage electrode 131, respectively, and the first storage capacitor Csta and the second storage capacitor Cstb reinforce the voltage-keeping ability of the first liquid crystal capacitor Clca and the second liquid crystal capacitor Clcb.

The capacitor electrode 137 and the expansion 177c of the third drain electrode 175c make a voltage reduction capacitor Cstd by overlapping each other with the gate insulating layer 140 and the semiconductor therebetween. However, the semiconductor between the capacitor electrode 137 and the expansion 177c of the third drain electrode 175c may be removed.

Hereinafter, the upper panel 200 is described.

A light blocking member (not illustrated) is formed on the insulation substrate 210 made of transparent glass or plastic. The light blocking member, which is also called a black matrix, prevents light leakage between the pixel electrodes 191. The light blocking member has a plurality of openings (not illustrated) that face the pixel electrode 191 and has a shape substantially the same as the pixel electrode 191. However, the light blocking member may be composed of a portion corresponding to the gate lines 121a and 121b and the data lines 171a and 171b and a portion corresponding to the thin film transistor.

A plurality of color filters 230 is formed on the substrate 210. Most part of the color filter 230 is in the region surrounded by the light blocking member and may be longitudinally elongated along the line of the pixel electrodes 191. The color filters 230 each can display one of three primary colors of red, green, and blue.

An overcoat 250 is formed on the color filter 230. The overcoat 250 may be made of an insulator, prevents the color filter 230 from being exposed, and provides a flat surface. The overcoat 250 may or may not be present.

A common electrode 270 is formed on the overcoat 250. The common electrode 270 is made of a transparent conductor such as ITO and IZO and a set of cutouts 71, 71a1, 71a2, 71a3, 71b1, 71b2, and 71b3 is formed in the common electrode 270.

The set of cutouts includes the center cutout 71, the first to third lower cutouts 71a1, 71a2, and 71a3, and the first to third upper cutouts 71b1, 71b2, and 71b3.

The cutouts 71, 71a1, 71a2, 71a3, 71b1, 71b2, and 71b3 are disposed between lower and upper orthogonal cutouts 92a1, 92a2, 92b1, and 92b2 of the pixel electrode 191 or between the lower and upper orthogonal cutouts 92a1, 92a2, 92b1, and 92b2 of the pixel electrode and the edges of the pixel electrode 191.

The set of cutouts 71, 71a1, 71a2, 71a3, 71b1, 71b2, 71b3 are substantially reversely symmetric to each other with respect to a virtual transverse center line of the pixel electrode 191.

The cutouts of the pixel electrode 191 and the cutouts of the common electrode 270 divide the pixel electrode 191 into a plurality of sub-areas and the sub-areas each have two primary edges making an oblique angle with the primary edge of the pixel electrode 191. Since most of the liquid crystal molecules 310 on the sub-areas are inclined perpendicular to the primary edge, the inclination direction lies in substantially four directions.

As described above, by varying the inclination directions of the liquid crystal molecules 310, the reference viewing angle of the liquid crystal display increases.

The inner sides of the lower panel 100 and the upper panel 200 are coated with alignment layers 11 and 21, respectively, and which may be vertical alignment layers. In detail, the alignment layers 11 and 21 may be positioned on the pixel electrode 191 and the common electrode 270, respectively.

A polarizer (not illustrated) may be disposed on the outer sides of the display panels 100 and 200, in which the transmissive axes of the polarizers are perpendicular to each other and one of them may be parallel to the gate line 121. One of the two polarizers may not be present in a reflective type liquid crystal display.

The liquid crystal layer 3 is disposed between the lower panel 100 and the upper panel 200. The liquid crystal layer 3 includes a plurality of liquid crystal molecules 310.

The liquid crystal molecules 310 have negative dielectric anisotropy and the long axis of the liquid crystal molecules 310 is aligned substantially perpendicular to the surfaces of the panels 100 and 200 when there is no electric field.

In the present exemplary embodiment, the liquid crystal layer 3 includes the liquid crystal molecules 310 made of the exemplary liquid crystal composition described herein. In detail, the liquid crystal layer 3 includes a first compound expressed by the following Chemical Formula 1 and a second compound expressed by the following Chemical Formula 2, Chemical Formula 1

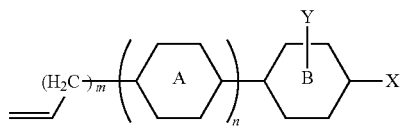

where A and B are a cyclo-hexyl group or a phenyl group, m is 0 to 4, n is 1 to 2, X is an alkyl group or an alkoxy group, and Y represents one or two fluorine (F) or chlorine (Cl) atoms, and Chemical Formula 2

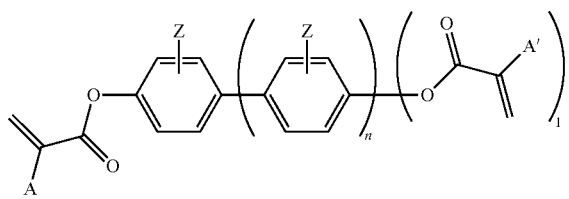

where n is 0 to 2, I is 0 to 1, Z is a halogen group, an alkyl group, or an alkoxy group, and A and A' are methyl groups.

The first compound may be the compound expressed by the following Chemical Formula 3, Chemical Formula 3

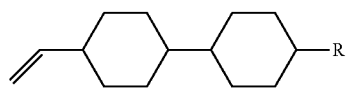

where R is an alkyl group or an alkoxy group.

The second compound may be at least one compounds expressed by the following Chemical Formulae 4 to 6.

Chemical Formula 4

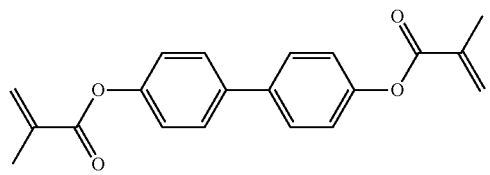

Chemical Formula 5

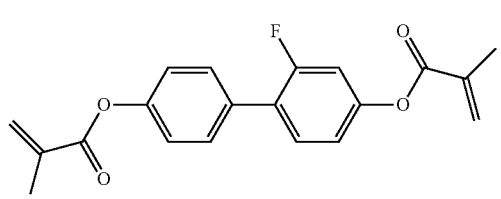

Chemical Formula 6

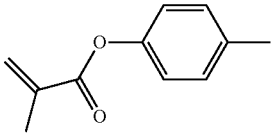

In an exemplary embodiment, the liquid crystal composition may include the first compound in an amount of about 30 wt % to about 40 wt % and the second compound in an amount of about 0.001 wt % to about 0.05 wt % based on the total weight of the liquid crystal composition.

In another exemplary embodiment, the liquid crystal composition may further include a third compound expressed by the following Chemical Formula 7.

Chemical Formula 7

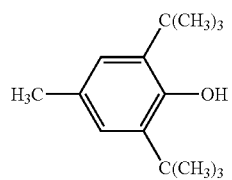

The third compound may function as an antioxidant for the first compound and the third compound, and may be present in an amount of about 0.001 to about 0.05 wt %.

In exemplary embodiment, the liquid crystal composition may include at least one compound expressed by Chemical Formula 1, Chemical Formula 8 and Chemical Formula 9, as the first compound.

Chemical Formula 8

Chemical Formula 9

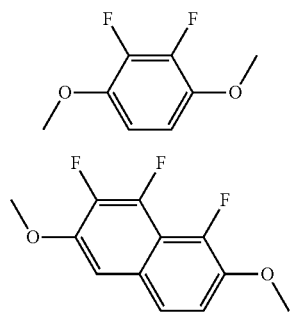

The description of the exemplary liquid crystal composition which was provided above can be applied to the liquid crystal composition in the liquid crystal layer 3 of the liquid crystal display according to the present exemplary embodiment.

Figure 8:
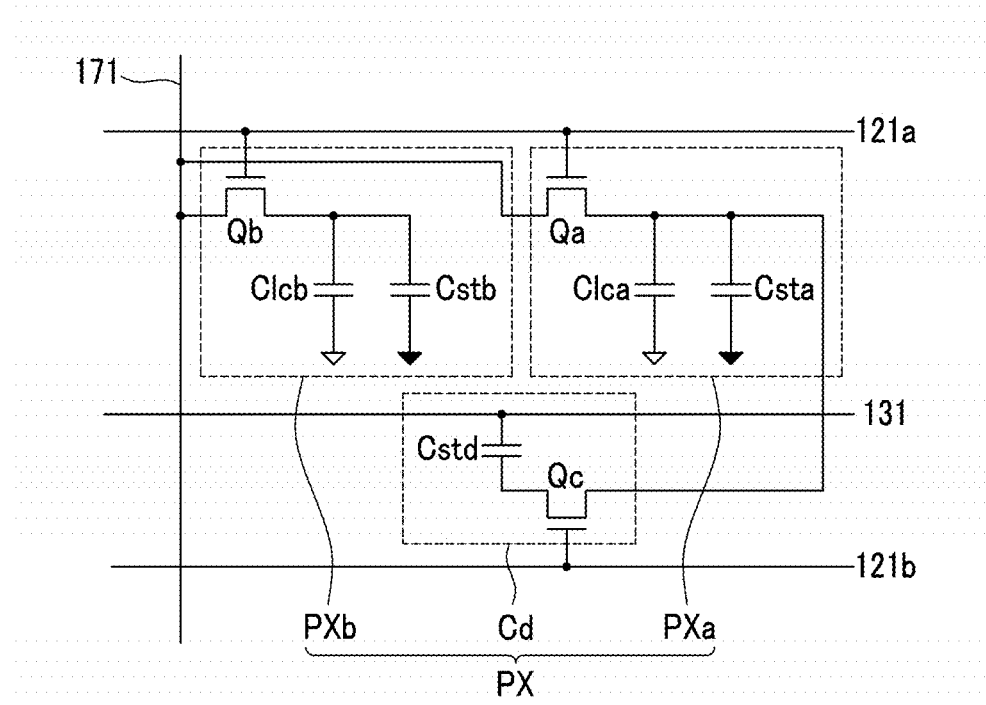
FIG. 8 is a circuit diagram of one pixel of the exemplary liquid crystal display illustrated in FIG. 6.

FIG. 8 is an equivalent circuit diagram of one pixel of the liquid crystal display illustrated in FIG. 6. The circuit structure and operation of the liquid crystal display illustrated in FIG. 6 are described with reference to FIG. 8.

The exemplary liquid crystal display includes a signal line including a first gate line 121a, a second gate line 121b, a storage electrode line 131, and a data line 171, and a pixel PX connected to the signal line.

The pixel PX includes a first subpixel PXa, a second subpixel PXb, and a voltage reduction unit Cd.

The first subpixel PXa includes a first switching element Qa, a first liquid crystal capacitor Clca, and a first storage capacitor Csta, the second subpixel PXb includes a second switching element Qb, a second liquid crystal capacitor Clcb, and a second storage capacitor Cstb, and the voltage reduction unit Cd includes a third switching element Qc and a voltage reduction capacitor Cstd.

The first and second switching elements Qa and Qb are three terminal elements such as thin film transistors on a lower panel, with the control terminals connected with the first gate line 121a, the input terminals connected with the data line 171, and the output terminals connected with the first and second liquid crystal capacitors Clca and Clcb and the first and second storage capacitors Csta and Cstb.

The third switching element Qc is also a three terminal element such as a thin film transistor which is disposed on a lower panel, with the control terminal connected with the second gate line 121b, the input terminal connected with the first liquid crystal capacitor Clca, and the outer terminal connected with the voltage reduction capacitor Cstd.

The first and second liquid crystal capacitors Clca and Clcb are formed by overlapping the first and second subpixel electrodes 191a and 191b connected with the first and second switching elements Qa and Qb and the common electrode of the upper panel, respectively. The first and second storage capacitors Csta and Cstb are formed by overlapping the storage electrode line 131 and the first and second subpixel electrode 191a and 191b.

The voltage reduction capacitor Cstd is connected to the output terminal of the third switching element Qc and the storage electrode line 131, and the storage electrode line 131 which is disposed on a lower panel and the output terminal of the third switching element Qc overlap each other with an insulator therebetween.

The operation of the liquid crystal display illustrated in FIG. 6 is described.

First, when a gate-on voltage ("Von") is applied to the first gate line 121a, the first and second thin film transistors Qa and Qb connected to the first gate line are turned on.

Accordingly, the data voltage on the data line 171b is equally applied to the first and second subpixels 191a and 191b through the turned-on first and second switching elements Qa and Qb. The first and second liquid crystal capacitors Clca and Clcb are charged as much as the voltage difference between the common voltage Vcom on the common electrode 270 and the voltage on the first and second subpixel electrodes 191a and 191b, so the charging voltage of the first liquid crystal capacitor Clca and the charging voltage of the second liquid crystal capacitor Clcb are the same. A gate-off voltage ("Voff") is applied to the second gate line 121b.

Next, when the gate-off voltage Voff is applied to the first gate line 121a and the gate-on voltage Von is applied to the second gate line 121b, the first and second switching elements Qa and Qb connected to the first gate line 121a are turned off and the third switching element Qc is turned on. Accordingly, the electrical charges at the first subpixel 191a connected with the output terminal of the first switching element Qa flow to the voltage reduction capacitor Cstd, and thus the voltage of the first liquid crystal capacitor Clca drops.

Assuming that the exemplary liquid crystal display is driven in frame inversion a data voltage having positive (+) polarity with respect to the common voltage Vcom is applied to the data line in the present frame, and negative (−) electrical charges are accumulated in the voltage reduction capacitor Cstd after the previous frame ends. When the third switching element Qc is turned on in the present frame, the positive electrical charges at the first subpixel electrode 191a flow into the voltage reduction capacitor Cstd through the third switching element Qc, so positive electrical charges collect in the voltage reduction capacitor Cstd and the voltage of the first liquid crystal capacitor Clca drops. In the next frame, in contrast, as the third switching element Qc is turned on with the first subpixel electrode 191a charged with negative electrical charges, the negative electrical charges at the first subpixel electrode 191a flow into the voltage reduction capacitor Cstd, so negative electrical charges collect in the voltage reduction capacitor Cstd and the voltage of the first liquid crystal capacitor Clca also drops.

As described above, according to the present exemplary embodiment, the charging voltage of the first liquid crystal capacitor Clca can keep lower than the charging voltage of the second liquid crystal capacitor Clcb. Accordingly, it is possible to improve the side visibility of the liquid crystal display by making the charging voltages of the first and second liquid crystal capacitors Clca and Clcb different.

Unlike the present exemplary embodiment, the first and second switching elements Qa and Qb of the first and second subpixels 191a and 191b may receive different data voltages obtained from one item of image information through different data lines or may be connected to different gate lines and receive different data voltages obtained from one item of image information at different times. Alternatively, only the first subpixel electrode 191a may receive a data voltage through a switching element and the second subpixel electrode 191b may receive a relatively low voltage by capacitive combination with the first subpixel electrode 191a. In the exemplary embodiments, the third switching element Qc and the voltage reduction capacitor Cstd may be removed.

Next, another exemplary embodiment of a liquid crystal is described in detail with reference to FIGS. 9 and 10.

Figure 9:
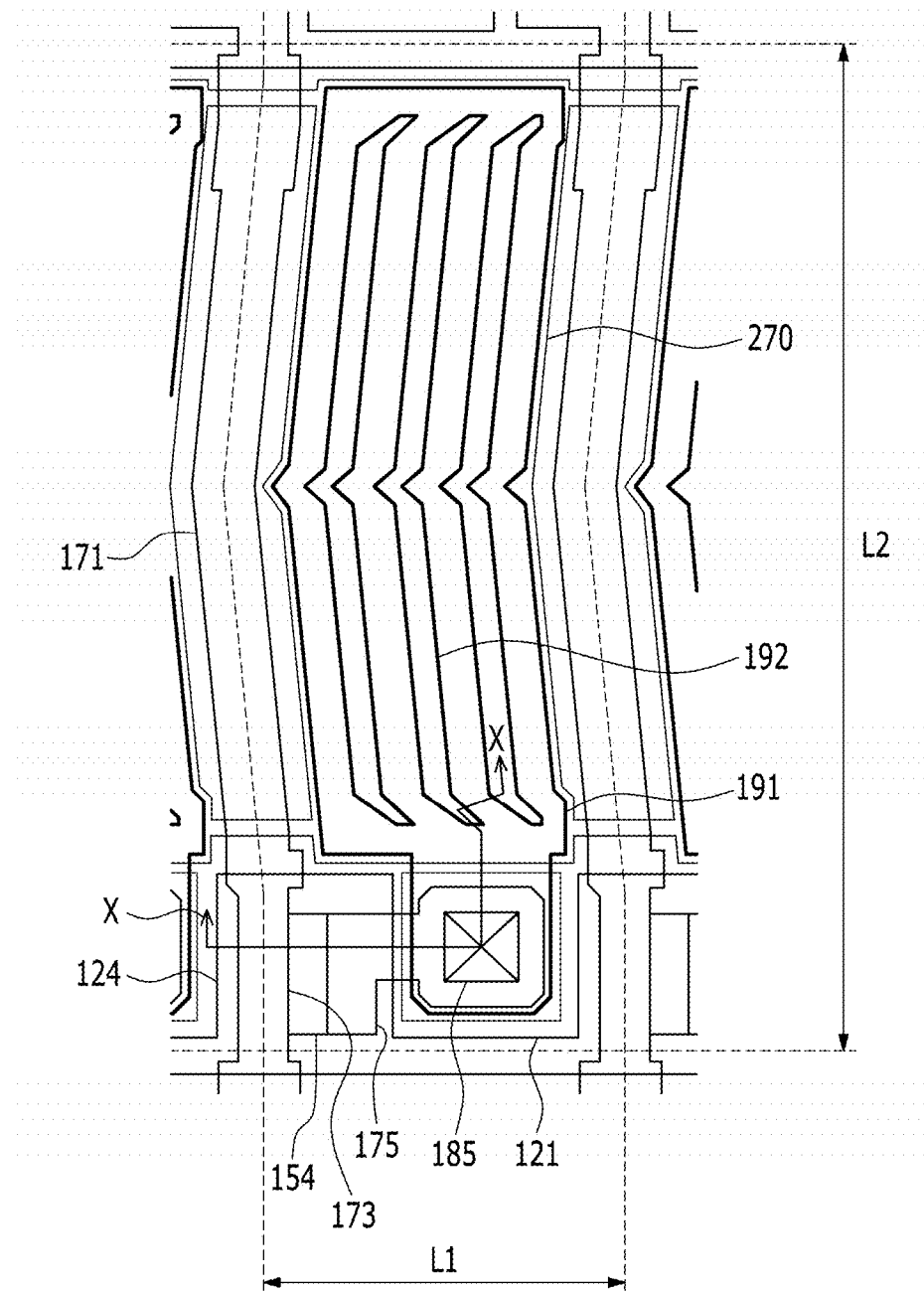
FIG. 9 is a plan view of yet another exemplary liquid crystal display.
Figure 10:
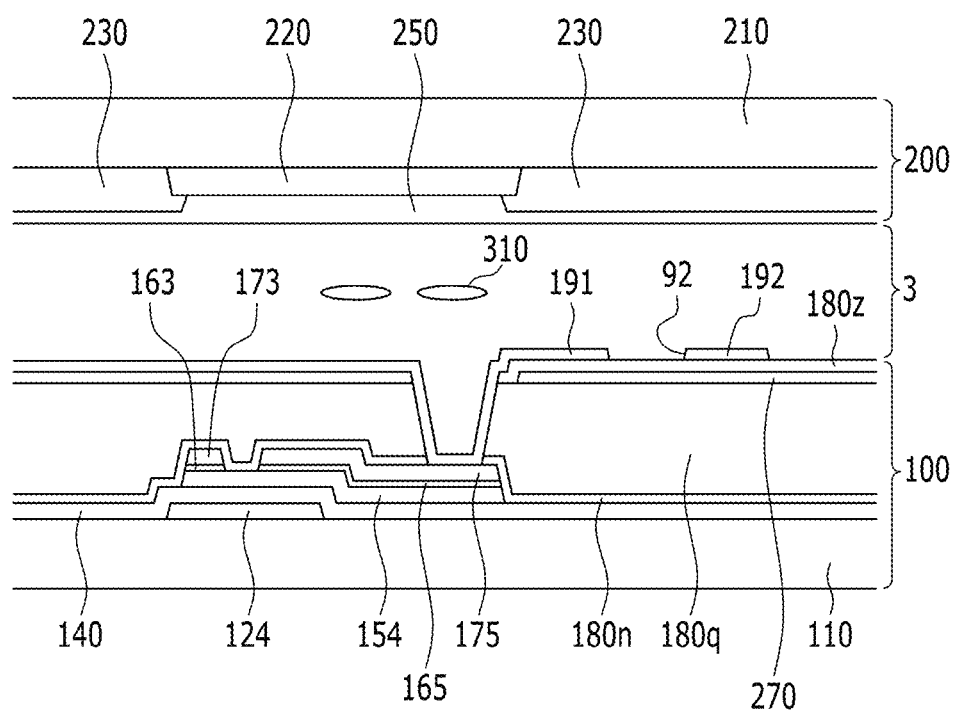
FIG. 10 is a cross-sectional view taken along line X-X of the exemplary liquid crystal display in FIG. 9.

FIG. 9 is a plan view of an exemplary embodiment of a liquid crystal display and FIG. 10 is a cross-sectional view taken along line X-X of FIG. 9.

Referring to FIGS. 9 and 10, the exemplary liquid crystal display includes a lower panel 100 and an upper panel 200 which face each other, and a liquid crystal layer 3 injected between the panels. Although one pixel area is exemplified in the following description, the liquid crystal display according to an exemplary embodiment of the present invention may have resolution of about 200 pixels per inch (PPI) or more. That is, over 200 pixels can be included in an area of 1 inch (in)×1 in on the liquid crystal display. Further, one pixel of the exemplary liquid crystal display may have the width L1 of about 40 micrometers (μm) or less and the length of about 120 μm or less. As illustrated in the figures, the width L1 of the pixel is the gap between longitudinal centers of two adjacent data lines 171 and the length L2 of the pixel is the gap between the lateral centers of two adjacent gate lines 121.

First, the lower panel 100 is described.

A gate conductor including gate line 121 is formed on an insulation substrate 110 made of transparent glass or plastic.

The gate line 121 has a wide end (not illustrated) for connecting the gate electrode 124 with another layer or an external driving circuit. The gate line 121 may be made of aluminum or aluminum-based metal such as an aluminum alloy, silver (Ag) or silver-based metal such as a silver alloy, copper (Cu) or a copper-based metal such as a copper alloy, molybdenum (Mo) or a molybdenum-based metal such as a molybdenum alloy, chromium (Cr), tantalum (Ta), and titanium (Ti). However, the gate line 121 may have a multilayer structure including at least two conductive layers having different physical properties.

A gate insulating layer 140 made of silicon nitride (SiNx) or silicon oxide (SiOx) is formed on the gate conductor 121. The gate insulating layer 140 may have a multilayer structure including at least two insulating layers having different physical properties.

A semiconductor 154 made of amorphous silicon or polysilicon is formed on the gate insulating layer 140. The semiconductor 154 may include an oxide semiconductor.

Ohmic contacts 163 and 165 are formed on the semiconductor 154. The ohmic contacts 163 and 165 may be made of a substance such as n+ hydrogenated amorphous silicon doped with n-type impurities such as phosphorous at high concentration or may be made of silicide. The ohmic contacts 163 and 165 may be disposed in a pair on the semiconductor 154. When the semiconductor 154 is an oxide semiconductor, the ohmic contacts 163 and 165 may not be provided.

A data line 171 including a source electrode 173 and a data conductor including a drain electrode 175 are formed on the ohmic contacts 163 and 165 and gate insulating layer 140.

The data line 171 has a wide end (not illustrated) for connection with another layer or an external driving circuit. The data line 171 transmits a data signal and usually extends longitudinally to cross the gate line 121.

The data line 171 may have a first curved portion having a curved shape to achieve the maximum transmittance of the liquid crystal display and the curved portions may make a V-shape by meeting each other at the middle region of a pixel area. A second curved portion curved to make a predetermined angle with the first bending portion may be further included in the middle region of the pixel area.

The first curved portion of the data line 171 may be curved at an angle of about 7 degrees (°) to a longitudinal reference line (y, reference line extending in y direction) making 90 degrees to the direction (x direction) in which the gate line 121 extends. The second curved portion disposed in the middle region of a pixel area may be further curved to make an angle of about 7° to about 15° with respect to the first curved portion.

The source electrode 173 is a portion of the data line 171 and is disposed in the same line as the data line 171. The drain electrode 175 extends parallel with the source electrode 173. Accordingly, the drain electrode 175 is parallel with a portion of the data line 171.

The gate electrode 124, the source electrode 173, and the drain electrode 175 make one thin film transistor (TFT), together with the semiconductor 154 and the channel of the thin film transistor is formed at the semiconductor 154 between the source electrode 173 and the drain electrode 175.

The exemplary liquid crystal display includes the source electrodes 173 disposed in the same line as the data lines 171 and the drain electrodes 175 extending parallel with the data lines 171, so that it is possible to increase the area of the thin film transistor even without increasing the area occupied by the data conductor, and accordingly, the aperture ratio of the liquid crystal display can be increased.

The data line 171 and the drain electrode 175 may be made of a refractory metal such as molybdenum, chromium, tantalum, and titanium or alloys thereof, and may have a multilayer structure including a refractory metal layer (not illustrated) and a low-resistant conductive layer (not illustrated). For example, the multilayer structure may be a double layer of a lower layer made of chromium or molybdenum (alloy) and an upper layer made of aluminum (alloy) or a triple layer of a lower layer made of molybdenum (alloy), a middle layer made of aluminum (alloy), and an upper layer made of molybdenum (alloy). However, the data line 171 and the drain electrode 175 may be made of various other metal or conductors. The width of the data line 171 may be about 3.5 m±0.75.

A first passivation layer 180n is disposed on the exposed portions of the data conductors 171, 173, and 175, the gate insulating layer 140, and the semiconductor 154. The first passivation layer 180n may be made of an organic insulating material or an inorganic insulating material.

A second passivation layer 180q is disposed on the first passivation layer 180n. The second passivation layer 180q may not be provided. The second passivation layer 180q may be a color filter. When the second passivation layer 180q is a color filter, the second passivation layer 180q can display one of the primary colors, and the primary colors may be the three primary colors of red, green, and blue or yellow, cyan, and magenta. Though not illustrated in the figures, the color filter may further include a color filter illustrating mixtures of the primary colors or white other than the primary colors.

A common electrode 270 is formed on the second passivation layer 180q. The common electrode 270 is formed. The common electrode 270, which has a surface shape, may be formed in the shape of one plate on the front of the substrate 110 and may have an opening (not illustrated) on a corresponding region around the drain electrode 175. That is, the common electrode 270 may have the flat shape of a plate.

The common electrodes 270 in adjacent pixels are connected with each other and may receive a predetermined level of common voltage supplied from outside of the display area.

A third passivation layer 180z is formed on the common electrode 270. The third passivation layer 180z may be made of an organic insulating material or an inorganic insulating material.

A pixel electrode 191 is formed on the third passivation layer 180z. The pixel electrode 191 has curved edges substantially parallel to the first curved portion and the second curved portion of the data line 171. The pixel electrode 191 has a plurality of first cutouts 92 and includes a plurality of the first slit electrodes 192 defined by the first cutouts 92.

A first contact hole 185 exposing the drain electrode 175 is defined in the first passivation layer 180n, the second passivation layer 180q, and the third passivation layer 180z. The pixel electrode 191 is electrically and physically connected with the drain electrode 175 through the first contact hole 185 and receives a voltage from the drain electrode 175.

Though not illustrated in the figure, an alignment layer is coated on the pixel electrode 191 and the third passivation layer 180z and it may be a horizontal alignment layer which is rubbed in a predetermined direction. However, in exemplar embodiments of the liquid crystal display, the alignment layer may include a photoreaction material for photo-alignment.

Herein, the upper panel 200 is described.

A light blocking member 220 is formed on the insulation substrate 210 made of transparent glass or plastic. The light blocking member 220 is also called a black matrix and prevents light leakage.

A plurality of color filters 230 is formed on the substrate 210. When the second passivation layer 180q of the lower panel 100 is a color filter, the color filter 230 of the upper panel 200 may not be provided. Further, the light blocking member 220 of the upper panel 200 may be formed on the lower panel 100.

An overcoat 250 is formed on the color filter 230 and the light blocking member 220. The overcoat 250 may be made of an (organic) insulator, prevents the color filter 230 from being exposed, and provides a flat surface. The overcoat 250 may not be provided.

An alignment layer may be disposed on the overcoat 250.

The liquid crystal layer 3 includes a nematic liquid crystal material having positive dielectric anisotropy.

In the present exemplary embodiment, the liquid crystal layer 3 includes the liquid crystal molecules 310 made of the exemplary liquid crystal composition described herein. In detail, in an exemplary embodiment, the liquid crystal layer 3 includes a first compound expressed by the following Chemical Formula 1 and a second compound expressed by the following Chemical Formula 2, Chemical Formula 1

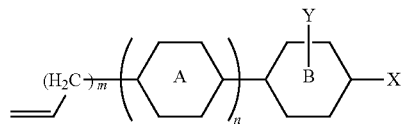

where A and B are a cyclo-hexyl group or a phenyl group, m is 0 to 4, n is 1 to 2, X is an alkyl group or an alkoxy group, and Y represents one or two fluorine (F) or chlorine (Cl) atoms, and Chemical Formula 2

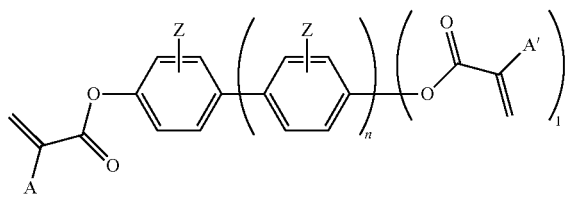

where n is 0 to 2, I is 0 to 1, Z is a halogen group, an alkyl group, or an alkoxy group, and A and A' are methyl groups.

The first compound may be the compound expressed by the following Chemical Formula 3, Chemical Formula 3

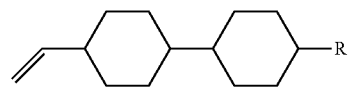

where R is an alkyl group or an alkoxy group.

The second compound may be at least one compound expressed by the following Chemical Formulae 4 to 6.

Chemical Formula 4

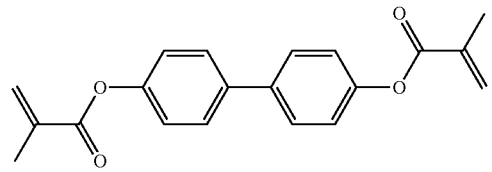

Chemical Formula 5

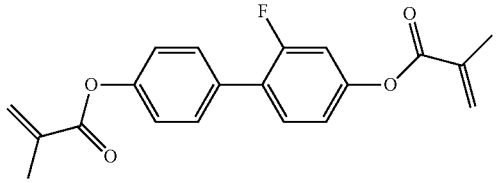

Chemical Formula 6

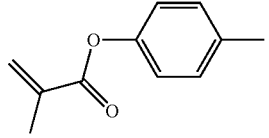

The exemplary liquid crystal composition may include the first compound in an amount of about 30 to about 40 wt % and the second compound in an amount of about 0.001 wt % to about 0.05 wt % to the total weight of the liquid crystal composition.

The exemplary liquid crystal composition may further include a third compound expressed by the following Chemical Formula 7.

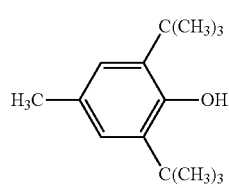

Chemical Formula 7

The third compound may function as an antioxidant for the first compound and the third compound may be present in an amount of about 0.001 wt % to about 0.05 wt %, based on the total weight of the liquid crystal composition.

In another exemplary embodiment, the liquid crystal composition may include one or more compounds selected from the compound expressed by Chemical Formula 1, the compounds expressed by the following Chemical Formula 8 and the compounds expressed by Chemical Formula 9, as the first compound.

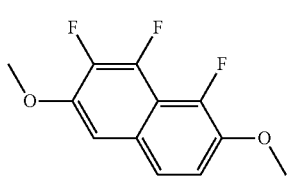

Chemical Formula 8

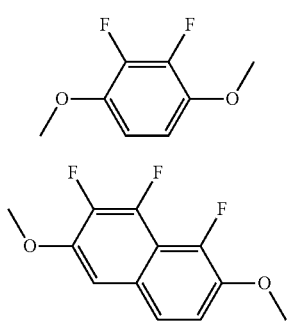

Chemical Formula 9

The long axes of the liquid crystal molecules of the liquid crystal layer 3 are arranged parallel to the panels 100 and 200 and are spirally twisted at 90° from the rubbing direction of the alignment layer of the lower panel 100 to the upper panel 200.

The pixel electrode 191 receives a data voltage from the drain electrode 175 and the common electrode 270 receives a predetermined level of common voltage from a common voltage applying unit outside the display area.

The pixel electrode 191 and the common electrode 270, which are field generating electrodes, generate an electric field, so the liquid crystal molecules in the liquid crystal layer 3 on the pixel electrode 191 and the common electrode 270 are turned parallel to the electric field. The polarization of light passing through the liquid crystal layer 3 depends on the rotation direction of the liquid crystal molecules determined as described above is different.

Other than the exemplary embodiments described above, the present invention can be applied to a liquid crystal display in which common electrodes and pixel electrodes are alternately arranged not in a plate shape electrode, but in a linear electrode on the lower panel. Further, the present invention is not limited thereto and can be applied to all types of liquid crystal displays as long as they are prepared without undergoing a light radiation process condition that may influence the reactive mesogen in a liquid crystal composition after injecting the liquid crystal composition into the liquid crystal layer.

As described above, in exemplary embodiments of the liquid crystal composition and the liquid crystal display including the liquid crystal composition, a predetermined amount of reactive mesogen is included with the liquid crystal composition, so the physical properties such as a voltage holding ratio, a response speed, a line residual image, and a surface residual image are excellent.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
   a first compound expressed by following Chemical Formula 1; and
   about 0.001 wt% to about 0.05 wt% of a second compound expressed by following Chemical Formula 2,

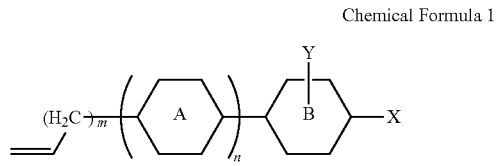

Chemical Formula 1 wherein, in Chemical Formula 1, A and B are a cyclohexyl group or a phenyl group, m is 0 to 4, n is 1 to 2, X is an alkyl group or an alkoxy group, and Y is one or two fluorine or chlorine atoms, and

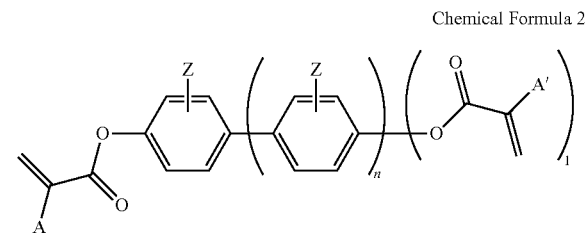

Chemical Formula 2 wherein, in Chemical Formula 2, n is 0 to 2, l is 1, Z is a halogen group, an alkyl group, or an alkoxy group, and A and A' are methyl groups.

2. The liquid crystal composition of claim 1, wherein:
   the first compound is present in an amount of about 30 wt% to about 40 wt% and
   the second compound is present in an amount of about 0.02 wt% to about 0.03 wt%, wherein the wt% are based on a total weight of the liquid crystal composition.

3. A liquid crystal composition comprising:
   a first compound expressed by following Chemical Formula 1; and about 0.001 wt% to about 0.05 wt% of a second compound expressed by following Chemical Formula 5 or Chemical Formula 6, Chemical Formula 1

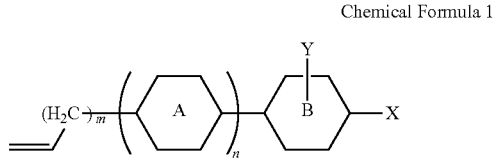

wherein, in Chemical Formula 1, A and B are a cyclohexyl group or a phenyl group, m is 0 to 4, n is 1 to 2, X is an alkyl group or an alkoxy group, and Y is one or two fluorine or chlorine atoms, and Chemical Formula 5

Chemical Formula 6

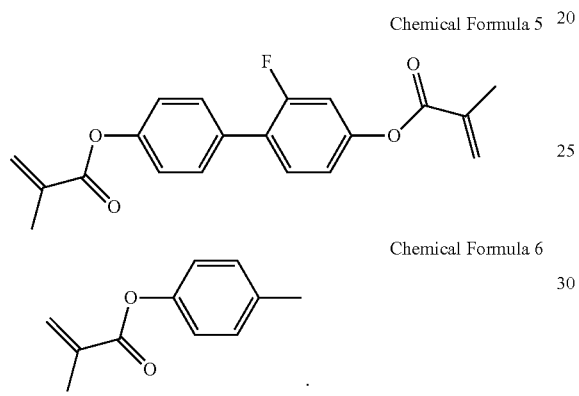

4. The liquid crystal composition of claim 2, further comprising: a third compound expressed by following Chemical Formula 7, Chemical Formula 7

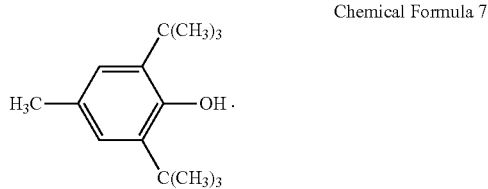 [SMILES: Cc1cc(C(C)(C)C)c(O)c(C(C)(C)C)c1]

5. The liquid crystal composition of claim 4, wherein: the third compound is present in an amount of about 0.001 wt% to about 0.05 wt% based on the total weight of the liquid crystal composition.

6. The liquid crystal composition of claim 1, wherein: the first compound further comprises at least one compound expressed by following Chemical Formula 8 and following Chemical Formula 9, Chemical Formula 8

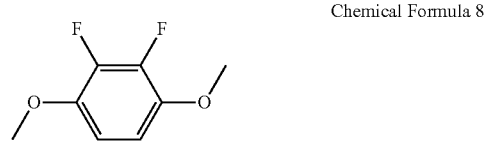

Chemical Formula 9

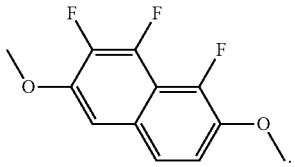

7. The liquid crystal composition of claim 6, wherein: the first compound is present in an amount of about 30 wt% to about 40 wt% based on a total weight of the liquid crystal composition.

8. A liquid crystal display comprising:
a first substrate;
a second substrate facing the first substrate;
a field generating electrode formed on at least one of the first substrate and the second substrate; and
a liquid crystal layer comprising liquid crystal molecules between the first substrate and the second substrate,
wherein the liquid crystal molecules comprise a liquid crystal composition comprising:
a first compound expressed by following Chemical Formula 1, and about 0.001 wt% to about 0.05 wt% of a second compound expressed by following Chemical Formula 2, wherein wt% is based on a total weight of the liquid crystal composition, Chemical Formula 1

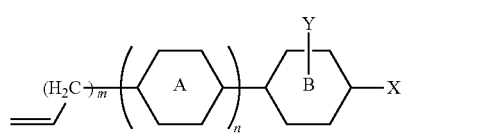

wherein, in Chemical Formula 1, A and B are a cyclohexyl group or a phenyl group, m is 0 to 4, n is 1 to 2, X is an alkyl group or an alkoxy group, and Y is one or two fluorine (F) or chlorine (Cl) atoms, and Chemical Formula 2

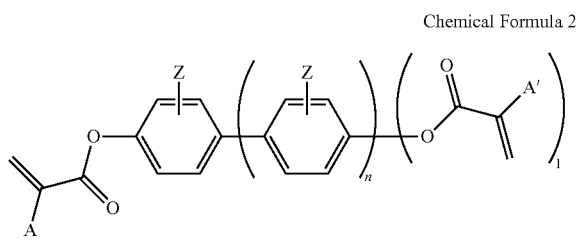

wherein, in Chemical Formula 2, n is 0 to 2, l is 1, Z is a halogen group, an alkyl group, or an alkoxy group, and A and A' are methyl groups.

9. The liquid crystal display of claim 8, wherein:
the first compound is present in an amount of about 30 wt% to about 40 wt%, and
the second compound is present in an amount of about 0.02 wt% to about 0.03 wt%, wherein wt% is based on the total weight of the liquid crystal composition.

10. A liquid crystal display comprising:
a first substrate;
a second substrate facing the first substrate;

a field generating electrode formed on at least one of the first substrate and the second substrate; and
a liquid crystal layer comprising liquid crystal molecules between the first substrate and the second substrate,
wherein the liquid crystal molecules comprise a liquid crystal composition comprising:
a first compound expressed by following Chemical Formula 1, and about 0.001 wt% to about 0.05 wt% of a second compound expressed by following Chemical Formula 5 or 6, wherein wt% is based on a total weight of the liquid crystal composition, Chemical Formula 1

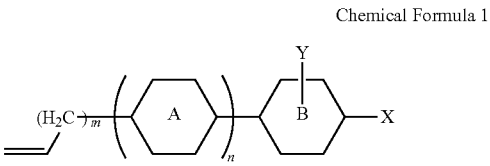

wherein, in Chemical Formula 1, A and B are a cyclohexyl group or a phenyl group, m is 0 to 4, n is 1 to 2, X is an alkyl group or an alkoxy group, and Y is one or two fluorine or chlorine atoms, and Chemical Formula 5

Chemical Formula 6

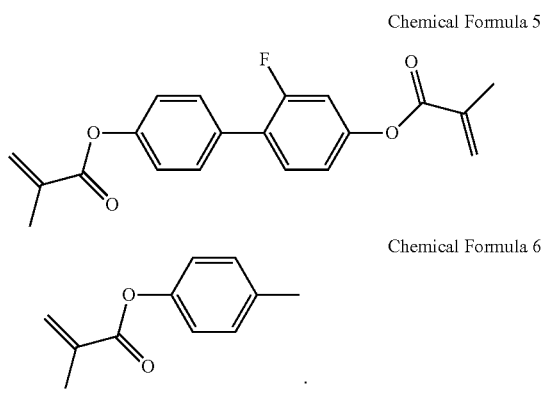

11. The liquid crystal display of claim 9, wherein: the liquid crystal composition further comprises a third compound expressed by following Chemical Formula 7, Chemical Formula 7

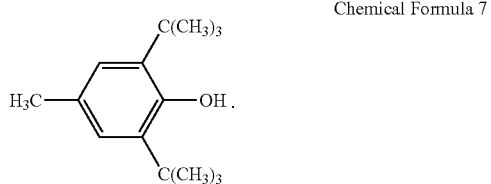

12. The liquid crystal display of claim 11, wherein: the third compound is present in an amount of about 0.001 wt% to about 0.05 wt% based on the total weight of the liquid crystal composition.

13. The liquid crystal display of claim 1, wherein: the first compound further comprises at least one compound expressed by following Chemical Formula 8 and following Chemical Formula 9, Chemical Formula 8

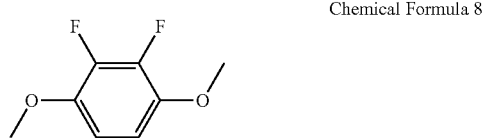

Chemical Formula 9

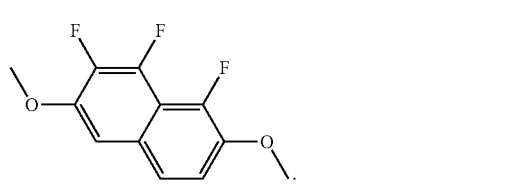

14. The liquid crystal display of claim 13, wherein: the first compound is present in an amount of about 30 wt% to about 40 wt% based on the total weight of the liquid crystal composition.

15. The liquid crystal display of claim 8, wherein:
the field generating electrode comprises a pixel electrode on the first substrate and a common electrode on the second substrate, and
the pixel electrode comprises first cutouts, the common electrode comprises second cutouts, and the first cutouts are arranged alternately with the second cutouts.

16. The liquid crystal display of claim 15, wherein the liquid crystal molecules are vertically aligned when there is no electric field.

17. The liquid crystal display of claim 15, wherein:
the field generating electrode comprises a common electrode and a pixel electrode insulated from each other on the first substrate, and
the liquid crystal display further comprises a slit electrode defined by the cutouts of at least one of the common electrode and the pixel electrode.

18. The liquid crystal display of claim 17, wherein: the liquid crystal molecules are horizontally aligned when there is no electric field.

* * * * *